United States Patent
Kim et al.

(10) Patent No.: US 7,245,641 B2
(45) Date of Patent: Jul. 17, 2007

(54) VARIABLE LENGTH PACKET SWITCHING SYSTEM

(75) Inventors: Chan Kim, Daejon (KR); Kyeong Soo Han, Daejon (KR); Je Soo Ko, Daejon (KR); Tae Whan Yoo, Daejon (KR); Jong Hyun Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 1035 days.

(21) Appl. No.: 10/247,174

(22) Filed: Sep. 19, 2002

(65) Prior Publication Data

US 2003/0118058 A1    Jun. 26, 2003

(30) Foreign Application Priority Data

Dec. 26, 2001    (KR) .............................. 2001-85016

(51) Int. Cl.
*H04J 3/04* (2006.01)
*H04J 3/02* (2006.01)
*H04L 12/50* (2006.01)
*H04Q 11/00* (2006.01)

(52) U.S. Cl. ................... 370/535; 370/537; 370/367; 370/387

(58) Field of Classification Search .................. None
See application file for complete search history.

(56) References Cited

U.S. PATENT DOCUMENTS 6,507,584 B1 * 1/2003 Moriwaki et al. .......... 370/398

6,970,433 B1 * 11/2005 Ramaswami et al. ....... 370/255

FOREIGN PATENT DOCUMENTS

KR    1999-018203    3/1999
KR    2000-0045263    7/2000

OTHER PUBLICATIONS

ISS '92, Oct. 1992, vol. 2, A Highly Modular Packet Switch for GB/S Rates, W.E. Denzel, et al., 3 pages.

* cited by examiner

*Primary Examiner*—Chi Pham
*Assistant Examiner*—Ronald Abelson
(74) *Attorney, Agent, or Firm*—Blakely Sokoloff Taylor & Zafman

(57) ABSTRACT

Disclosed herein is a variable length packet switching system. The variable length packet switching system includes at least two switching means, a plurality of multiplexing units and a plurality of demultiplexing units. The switching means switch ATM cells or variable length packet data in parallel. The multiplexing means are arranged upstream of the switching means for multiplexing data inputted from a line card to the switching means in packet units and dividing a packet into packets of a number corresponding to the number of the switching means. The demultiplexing means are arranged downstream of the switching means for combining packets inputted after being switched in parallel by the at least two switching means and outputting the combined packet converted into a format adequate to the line card.

4 Claims, 21 Drawing Sheets

Entire length is 48(32+16) (Packet is 42)

Entire length is 48(32+16) (Packet is 43)

VARIABLE LENGTH PACKET SWITCHING SYSTEM

BACKGROUND OF THE INVENTION

1. Field of the Invention

The present invention relates generally to a variable length packet switching system having a plurality of ports, and more particularly to a variable length packet switching system, in which a plurality of chips for dividing data into units of a predetermined length including overheads are employed in parallel to perform switching, and multiplexing/demultiplexing, buffering and format conversion are carried out by the port upstream/downstream of the chips, thereby allowing high-speed switching to be performed in a non-blocking manner without the intervention of software, and enabling the expansion of its capacity by the accommodation of various signals.

2. Description of the Prior Art

In a conventional packet switching system, a switch chip such as the MASCON developed by the Electronics and Telecommunications Research Institute (ETRI) has sixteen 8-bit input/output ports. In order to switch the sixteen 16-bit ports using the MASCON chip, two MASCON chips are arranged in parallel and 16-bit input/output data are switched by the two MASCON while being divided into upper and lower 8-bit data. Such a conventional switching system is provided with a 16-bit backplane, there is a disadvantage that the number of signals is increased. The current technology can provide a 10 Gbps switching system that is operated at 50 MHz and switches 16 ports with 16 bits. Additionally, in accordance with the technology, a 32-bit backplane is provided and 4 MASCON chips are used for each byte, so a switching system can be operated at 50 MHz while doubling the port speed of a switching board, e.g., up to 1.25 Gbps. However, the conventional switching system cannot perform switching for more than 32 ports. Additionally, there is a problem that the conventional switching system can be used only for ATM cells.

SUMMARY OF THE INVENTION

Accordingly, the present invention has been made keeping in mind the above problems occurring in the prior art, and an object of the present invention is to provide a variable length packet switching system, in which a plurality of chips for dividing data into units of a predetermined length including overheads are employed in parallel to perform switching, and multiplexing/demultiplexing, buffering and format conversion are carried out by the port upstream/downstream of the chips, thereby allowing high-speed switching to be performed in a non-blocking manner without the intervention of software, and enabling the expansion of its capacity by the accommodation of various signals.

In order to accomplish the above object, the present invention provides a variable length packet switching system, comprising: at least two switching means for switching ATM cells or variable length packet data in parallel; a plurality of multiplexing means arranged upstream of the switching means for multiplexing data inputted from a line card to the switching means in packet units and dividing a packet into packets of a number corresponding to the number of the switching means; and demultiplexing means arranged downstream of the switching means for combining packets inputted after being switched in parallel by the at least two switching means and outputting the combined packet converted into a format adequate to the line card.

In the present invention, a switching board carries out switching for 32 or 64 ports having a speed of 600 Mbps. In the 32 ports, the entire switching performance is 600 Mbps×32=20 Gbps. In the present invention, switching is carried out via three processing stages, in which the first stage multiplexes the entire input ports into 16 port groups; the second stage processes actual switching for the 16 port groups divided from the entire ports; and the third stage demultiplexes switched 16 port group data into the original ports, respectively. In the first stage, the entire ports are composed into the 16 groups, e.g. by combining every two ports into one port group if the entire ports are 32, and combining every 4 ports into one port group if the entire ports are 64. In the second stage, parallel processing is executed by using two or four basic switch chips having 16 ports, e.g., two switch chips having 16 ports are used to execute parallel switching for two parallel streams composed of the 16 port groups when the entire 32 ports are switched, and 4 switch chips having 16 ports are used to execute parallel switching for 4 parallel streams composed of the 16 port groups when the entire 64 ports are switched. Examples of the switch chips used in the second stage include an SE-C chip that was developed in cooperatively by the ETRI and Erlang Technology.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
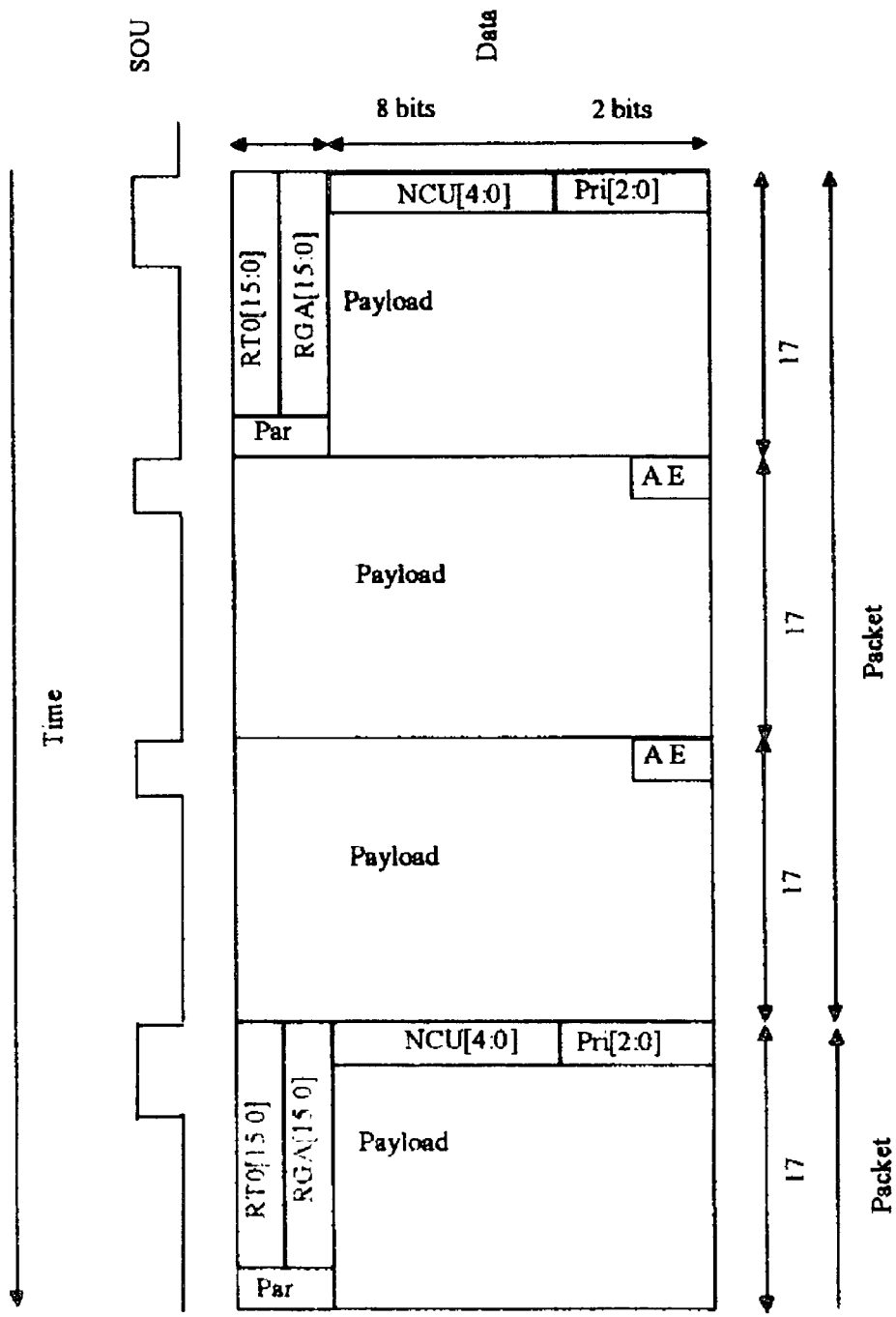
FIG. 1 is a view of an input/output data format of a switch chip employed in the present invention.

FIG. 1 shows an input/output data format of an SE-C switch chip employed in the present invention.

As shown in FIG. 1, data are 10 bits long. A basic switching unit is comprised of 17 clocks of 10-bit data, in which a first clock of 10 bit data are control information and the remaining 16 clocks of data are packet data. In order to switch a variable length packet, one packet is divided into several units, the divided units are inputted to a second stage, and the inputted units are switched and outputted in the same format from the second stage. To this end, a Start Of Unit (SOU) signal together with data is provided to indicate the starting position of the unit. In the case of the starting unit of the packet, the SOU signal maintains '1' for two clocks at the starting position of the unit as shown in FIG. 1; otherwise, the SOU signal maintains '1' for only one clock at the starting position of the unit.

The first 10-bit data of each unit are overheads and have control information, and the upper two bits of a first unit are control overheads. In FIG. 1, a Requested Group Address (RGA) indicates a destination port group to be switched when it is considered that the port group includes 16 ports. A Routing Tag (RT) indicates a final destination of 32 or 64 ports, when seen from an original switching board. The RT is transferred while being divided into the halves of 32 bits or quarters of 64 bits in the process of being divided into parallel streams. The RT is first used to form an RGA of a corresponding requested port group in a multiplexing unit 21, transferred to an demultiplexing unit 23 on the packet switched onto different parallel streams, and combined into the 32 or 64 bits again in the demultiplexing unit 23. The combined 32 or 64-bit RT is used to find the final requested port. The Number of Cell Unit (NCU) indicates how many units the corresponding packet is composed of. A Priority (Pri) indicates the priority of a corresponding packet. Each of the units of a packet except for a starting unit of the packet has A and E bits as its two lower bits, in which the A bit indicates whether a corresponding unit has valid data or not, while the E bit indicates whether a corresponding unit is the last unit of the packet or not. In the middle of a packet, an invalid empty unit may be located.

As described above, one packet is inputted in parallel to two or four SE-C switch chips 22 while being divided into several units. The divided units are switched in parallel at the same time, outputted in the same forms and then combined into the original packet.

Figure 2:
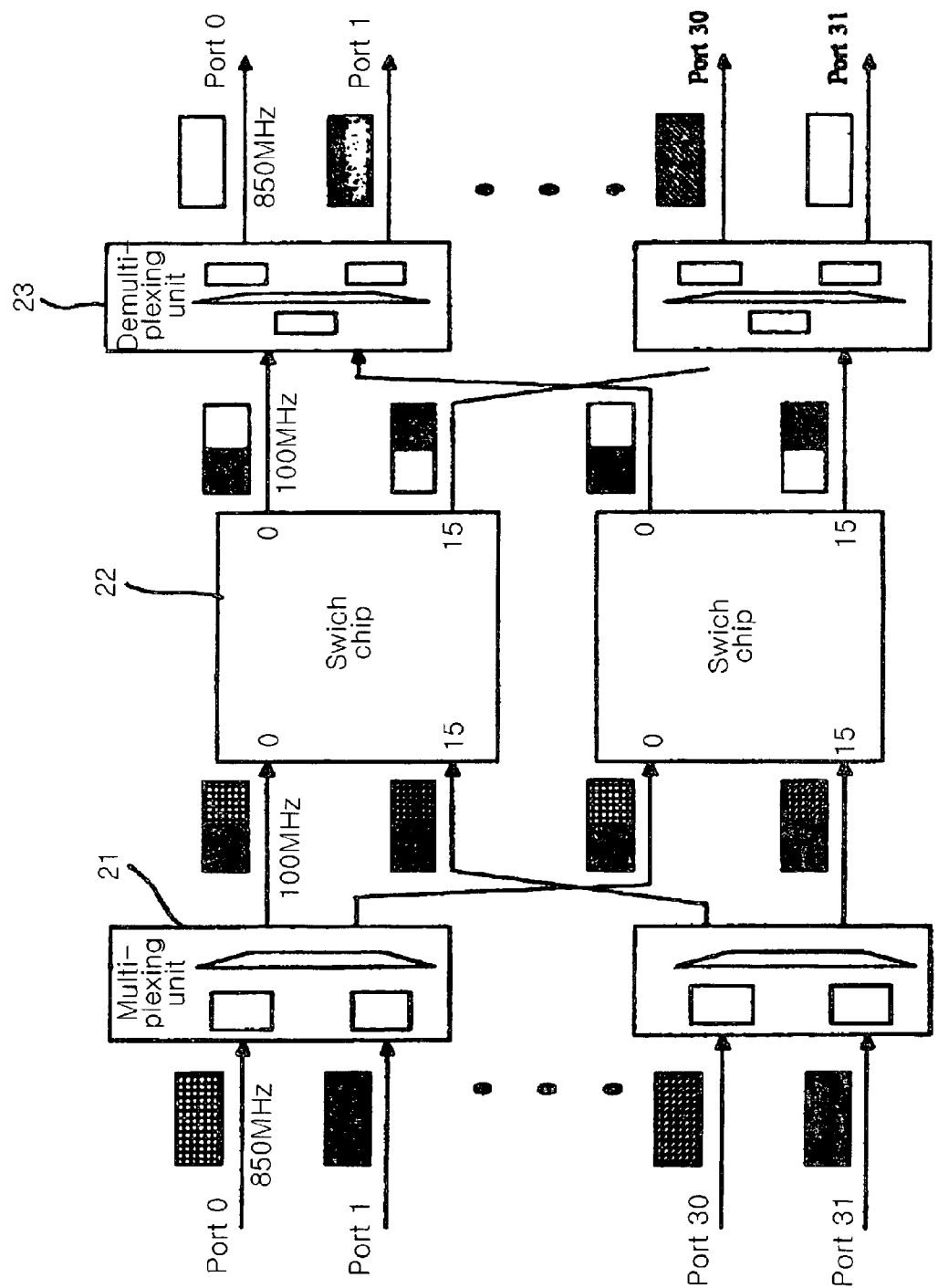
FIG. 2 is a schematic block diagram of a variable length packet switching system in accordance with the present invention.

With reference to FIG. 2, there is described a process of performing switching with regard to 32 ports of 622 Mbps using two SE-C switch chips 22 in parallel.

FIG. 2 is a schematic block diagram of a variable length packet switching system in accordance with the present invention.

In a 20 Gbps system, each of the multiplexing units 21 takes charge of two 600 Mbps input ports. Data inputted via each of the ports are divided and outputted in parallel to the same type of ports of the two switch chips 22, respectively. Data inputted via ports 0 and 1 of ports 0 to 31 in the switching system are multiplexed in packet units in the multiplexing unit 21, one packet is divided into two data units, and the two data units are inputted to ports 0 of the two switch chips 22, respectively. When two data divided and passed through the switch chips 22 move to a port 6 or 7 of ports 0 to 31, they are outputted to ports 3 of the switch chips 22, inputted to the corresponding demultiplexing units 23 where the 32 bit RTs are formed again, and then transferred to system ports 6 or 7 according to the RTs.

As described above, in the 20 Gbps switching system, one packet is processed in the two switch chips 22. In a 40 Gbps switching system, one packet is processed in four switch chips. In this case, there is no restriction in dividing payloads. For example, it is possible to convert one packet into 16 bits, divide the 16 bits into upper and lower 8-bit units and switch the two 8-bit units.

The functions of the multiplexing units and the demultiplexing units can be embodied in a Field Programmable Gate Array (FPGA) or an Application Specific Integrated Circuit (ASIC), and a circuit for processing several ports can be embodied in one chip. For example, the multiplexing units and the demultiplexing units for handling 4 ports can be embodied in one FPGA, and the multiplexing units and the demultiplexing units for handling eight ports can be embodied in one FPGA.

Figure 3:
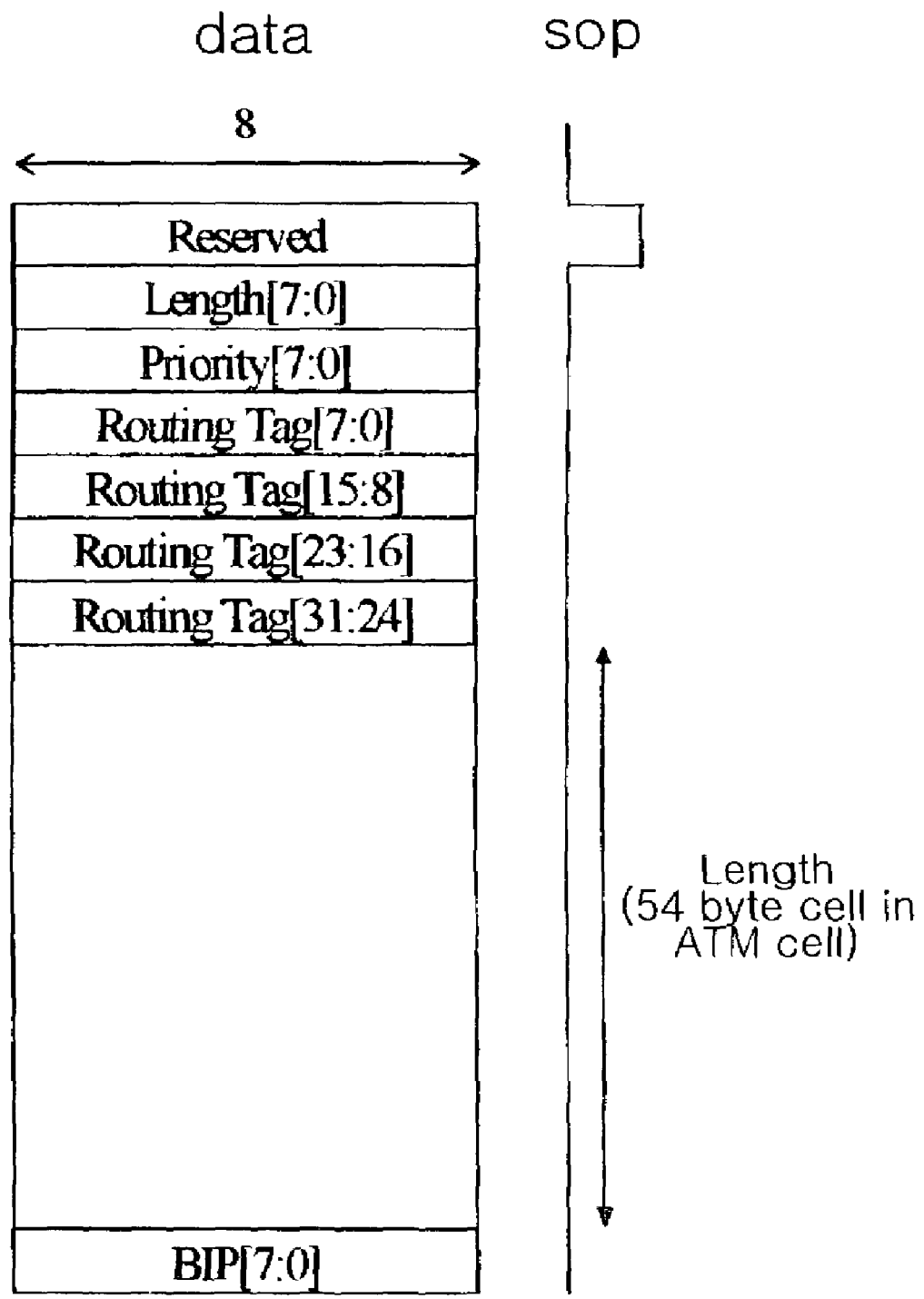
FIG. 3 illustrates a backplane cell format.

A format of a cell that is inputted/outputted via a backplane can be a general form shown in FIG. 3.

When a parallel backplane is employed, a SOP signal may be used. In contrast, when a serial interface is employed, it is required to inform a reception unit of SOP because there is no SOP signal. In the present invention, a basic length is given as 64 bytes. If there is a packet, a variable length packet as shown in FIG. 3 is transmitted. Otherwise, a 65-byte long idle packet is transmitted. If there is data, the starting pattern of a packet is "FF", and the length of the packet is determined by "Length". If there is no packet to be transmitted, the starting pattern of a packet is "FE", and the length of the packet is 64 bytes.

A method of identifying the boundaries of a packet in a reception unit of a backplane is described hereinafter. In this case, a method similar to a cell boundary identification method disclosed in the ITU-TI.432 is used as the method in which the reception unit of the backplane identifies the boundaries of a packet. The reception unit of the backplane is provided with a state machine for managing the state of packet boundary identification, which is initially in a hunt state and transits to a pre-synchronous state if the starting pattern is hit once in the hunt state. If starting patterns are hit at least six consecutive times by the inspection of starting patterns in the starting positions of the next packets, the state machine transits from the pre-synchronous state to a synchronous state. If the starting pattern is not found in a position where the starting pattern is expected, the state machine transits from the pre-synchronous state to the hunt state again. The synchronous state is continuously inspected by the inspection of starting patterns at the time points when the next packets are expected based upon the lengths of the packets, in which the length of the idle packet is 64 bits and the length of a valid packet is obtained through the extraction of length information. If the starting patterns are missed at least 7 times, the state machine transits from the synchronous state to the hunt state.

A Length[7:0] indicates the length of a packet that is situated between the RT and BIP (Parity), and a Routing Tag[31:0] indicates a port of system ports 0 to 31 to which a corresponding packet will be transferred, in bitmap. The presence of two or more bits of '1's in an RT means that packets should be simultaneously transferred to corresponding ports. Additionally, a Priority[7:0] indicates the priority of a corresponding packet. The second stage of a switching board is designed so that packets are outputted by scheduling according to priority after being stored in the second stage.

Figure 4:
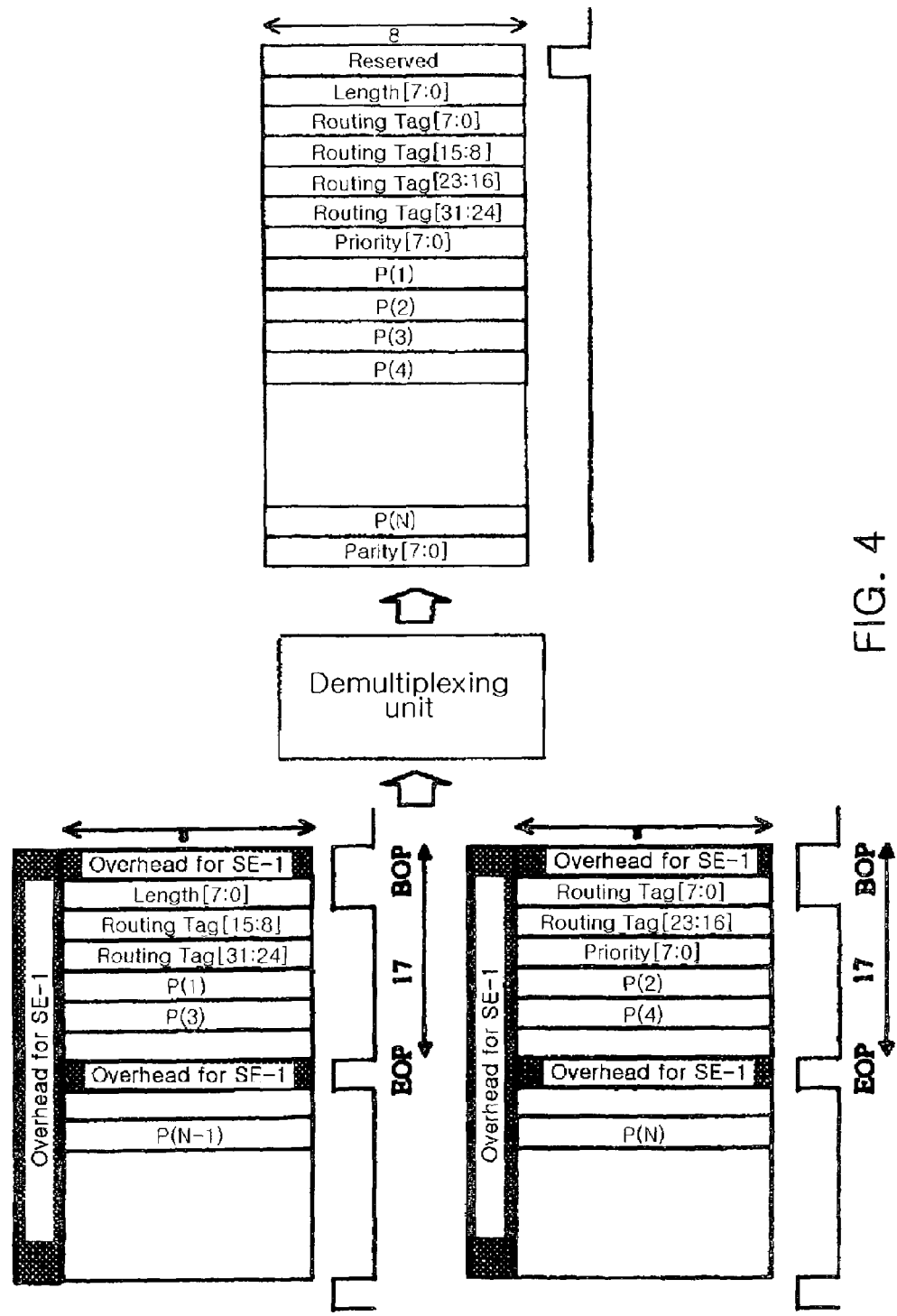
FIG. 4 illustrates a process of converting a cell format in a multiplexing unit in accordance with the present invention.

The RT included in the packet on the foregoing backplane is OR operated by two bits to form a 16-bit RGA while passing through the multiplexing unit. The 160 bit RGA is actually used for switching in a switch chip. For example, in a cell destined for a system port 3, RGA[15:0] is converted into RGA[1]. Then, this cell passes through a switch chip via a port 1 thereof, and the original 32-bit RT combined again in the demultiplexing unit and the cell is transferred to the system port 3 with reference to a partial RT RTAG[3:2]. For example, when 20 Gbps switching is implemented by arranging two switch chips in parallel, a packet inputted through a backplane is converted into a format shown in FIG. 4 while passing through the multiplexing unit.

A reserved byte primarily disappears, bytes are alternately moved to upper and lower 16 bytes from the Length, and the last Parity byte disappears also. If the Length, i.e., the number of bytes between the RT and the Parity, is odd, the Parity byte is transferred to the lower bytes. Such a Parity byte is already used in an input block of the multiplexing unit for extracting an error. The converted 16-bit data is divided into the upper and lower units, and every 16 byte has a 1-byte overhead at a front portion. In the case of a unit corresponding to the Beginning of Packet (BOP), the overhead indicates the NCU, i.e. the number of cell units existing in the corresponding packet and the Priority. In the case of a unit corresponding to the Continuation of Packet (COP), lower two bits contain information whether the corresponding unit is valid as well as whether the corresponding unit is the End of Packet (EOP). Further, the data has a two-bit overhead attached to a upper portion thereof. In the BOP unit, the value of the overhead includes the RGA (i.e. RT value used in the switch chip) and the RT (i.e., value selected by 16 bits from the inputted 32 bit RT).

Figure 5:
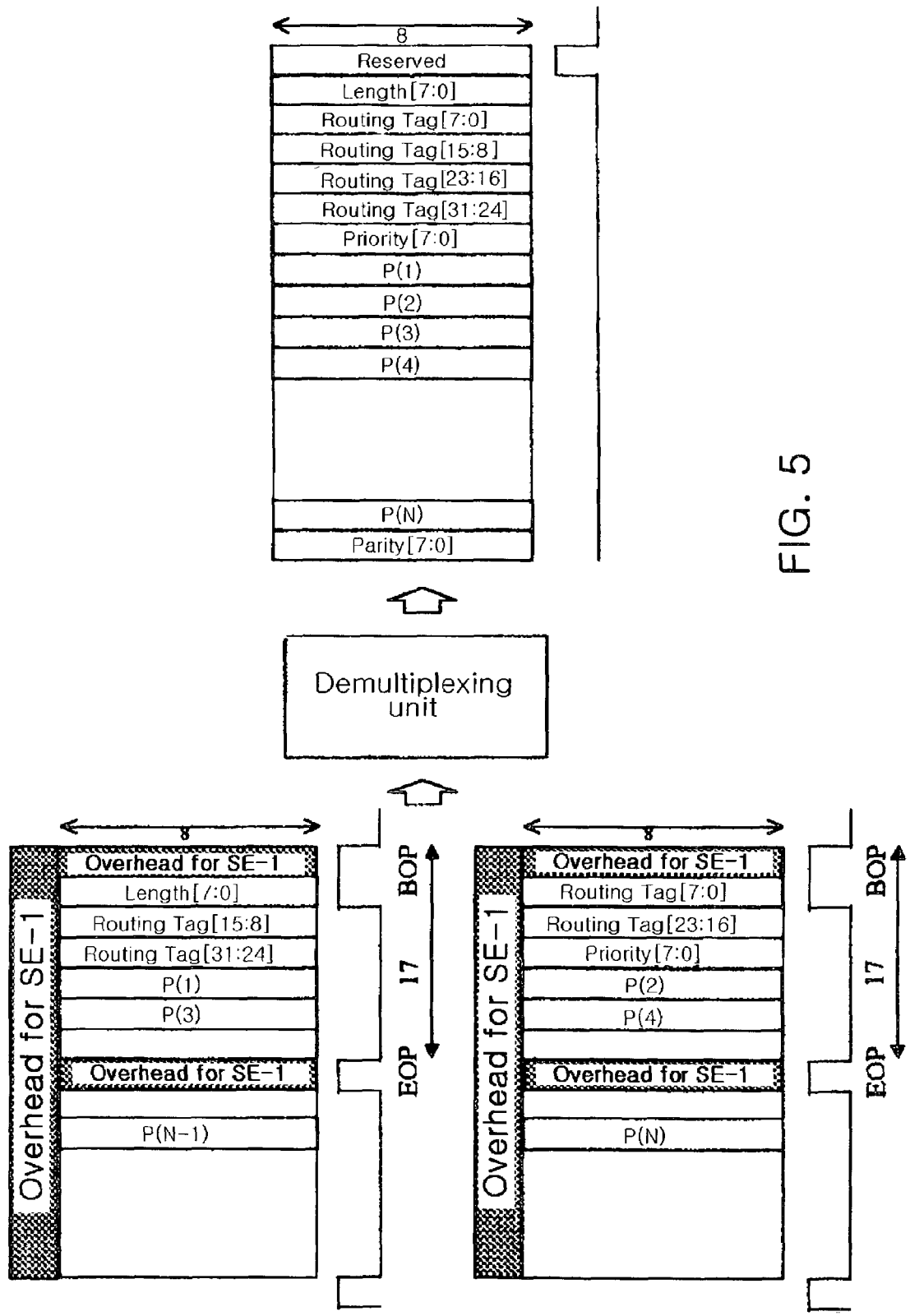
FIG. 5 illustrates a process of converting a cell format in an demultiplexing unit in accordance with the present invention.

The data is inputted to the upper and lower switch chips as divided through the multiplexing unit as above. The data is composed of 17 units and has pulses for periodically indicating the starting points of the units. The pulses are maintained for two clocks in a BOP portion and for 1 clock in the other portions. In the same manner, the packet, which is combined in the demultiplexing unit after passing through the switch chips, is composed into the original packet form with the overhead being removed as shown in FIG. 5.

The following will describe a detailed exemplary embodiment of the present invention as set forth above.

Figure 6:
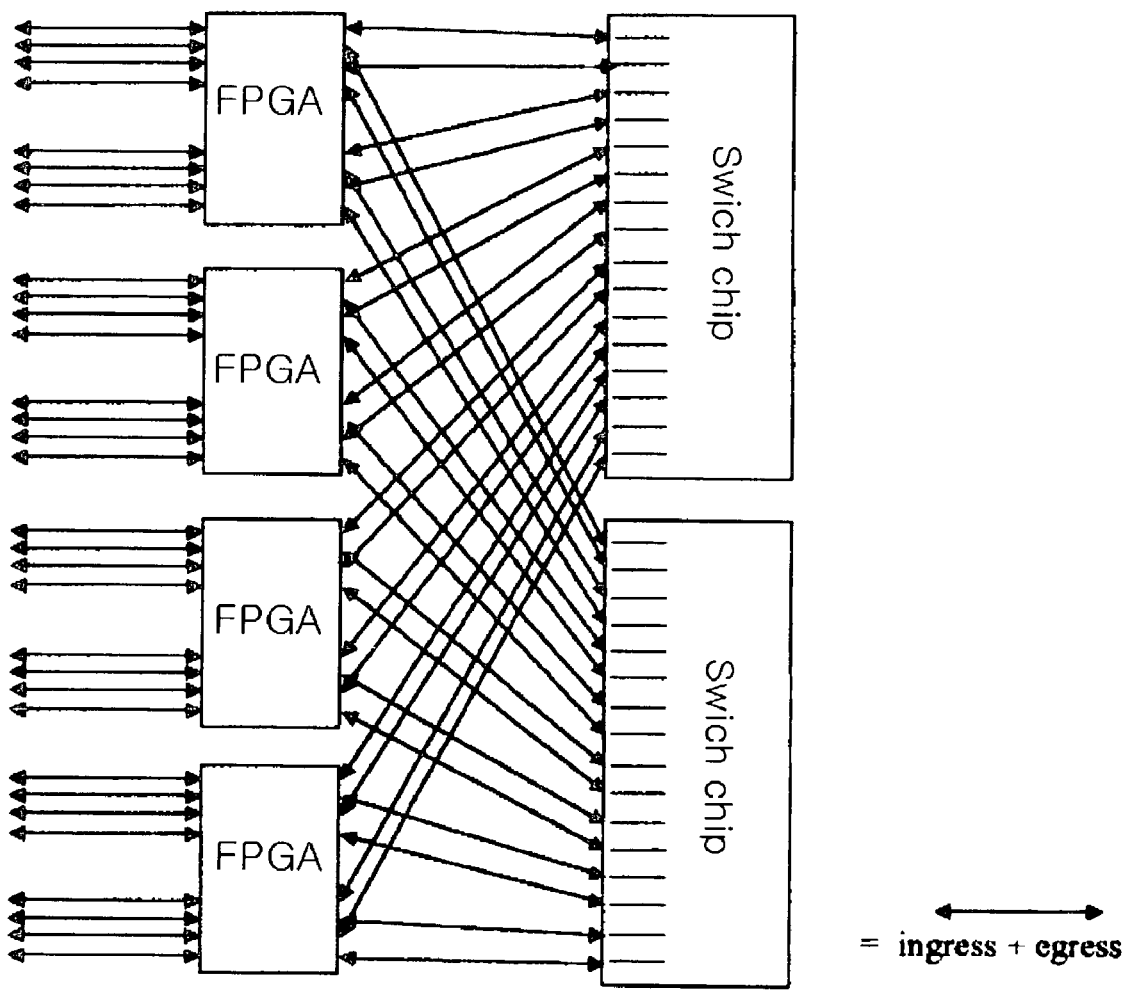
FIG. 6 is a diagram of an example of a variable length packet switching system in accordance with the present invention.

FIG. 6 illustrates an example of a variable length packet ATM switching system in accordance with the present invention.

Referring to FIG. 6, the switching system is provided at its center portion with two switch chips and between a backplane and the switch chips with four FPGAs that function as multiplexing/demultiplexing units. Each of the four FPGAs is an ORT8850H chip available from "Agere Systems", in which a circuit of multiplexing and demultiplexing units is implemented for eight ports. That is, one FPGA includes four multiplexing units and four demultiplexing units, and one multiplexing unit and one demultiplexing unit each manage two ports. When 20 Gbps switching is carried out for 32 ports and a circuit for handling eight ports is implemented in one FPGA as described above, the overall configuration of a board is as shown in FIG. 6.

Figure 7:
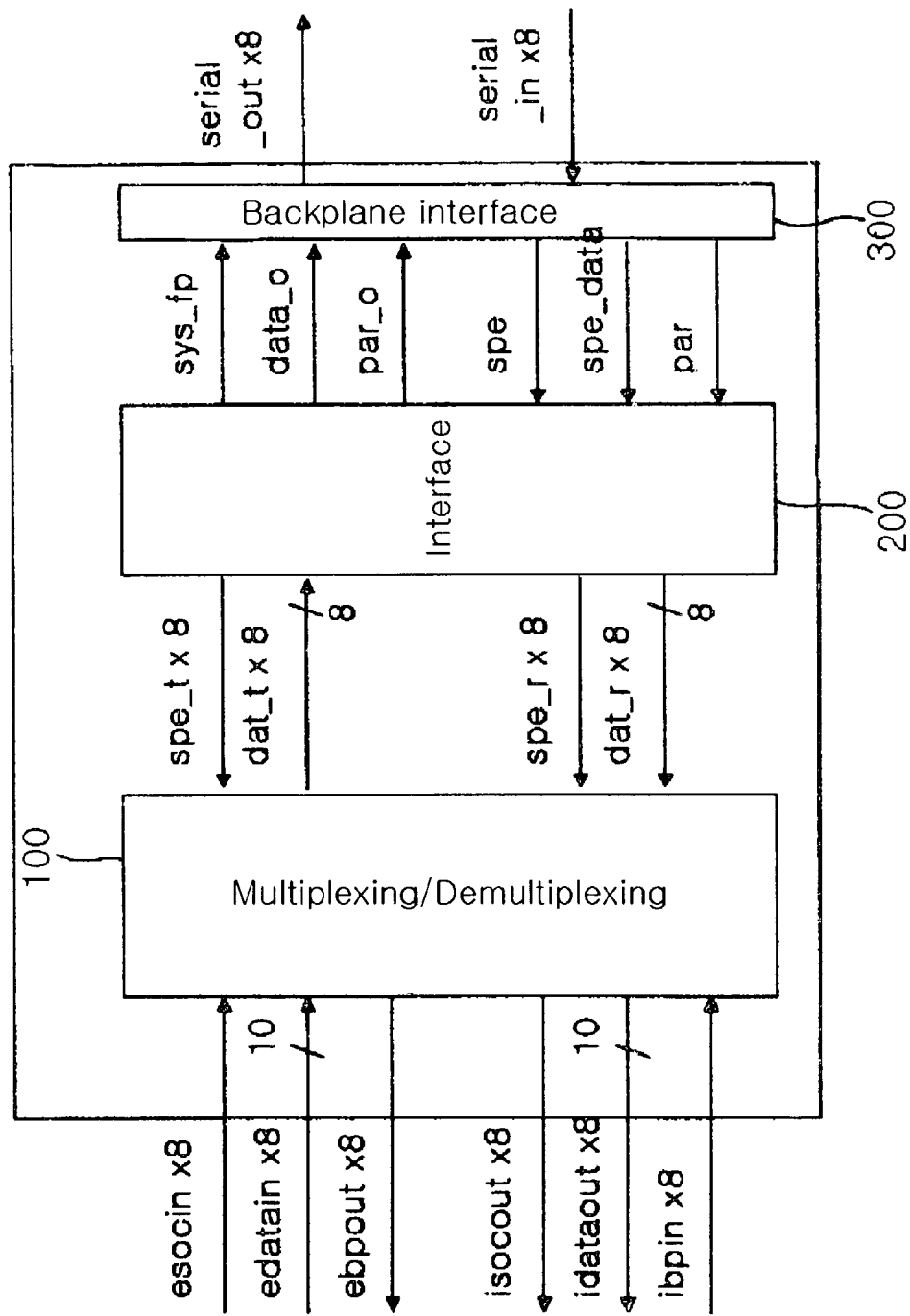
FIG. 7 is a diagram showing an internal configuration of an FPGA in accordance with the present invention.

FIG. 7 illustrates a detailed configuration of the FPGA shown in FIG. 6.

The FPGA is comprised of a backplane interface core 300 in charge of backplane interface for eight ports, a multiplexing/demultiplexing unit 100 adapted to function as a multiplexing unit for performing the first stage of switching and as a demultiplexing unit for performing the third stage of switching for the eight ports, and an interface unit 200 in charge of interface for the backplane interface core 300 and the multiplexing/demultiplexing unit 100 for the eight ports. As described above, the eight ports can be embodied in one FPGA. A different number of ports can be supported for convenience's shake.

FIG. 7 illustrates a case where a high-speed serial interface is used for a backplane. This drawing indicates that data are transmitted/received through a Synchronous Payload Envelope (SPE, see G.709 standards) interval signal portion, when the backplane employs an STM transmission technique (that is used for the backplane and supports a transmission speed of 850 Mbps faster than a speed of 622 Mbps without using some overheads) in which a pseudo-Synchronous Transport Module (STM) frame is used.

The interface unit 200 functions to connect the multiplexing/demultiplexing unit 100 with the backplane serial interface core 300 for the eight ports. The backplane interface employed in the present invention exists in an ORT8850H FPSC available from Agere Systems, and adopts the pseudo-STM technique that allows a transmission speed of 850 Mbps and does not use some overheads even though it is similar to an STM signal. A transmission unit of the core having a clock and data recovery function and a framer managing the above transmission receive a SYS_FP signal indicating the beginning of the frame from the FPGA logic, and in an SPE interval corresponding thereto, transmit data received from the FPGA logic in the form of serial signals. Additionally, the reception unit of the backplane interface core restores data from the received pseudo-STM signal, and transfers the data to an FPGA logic along with an SPE signal.

The interface unit 200, which carries out a transfer function between the multiplexing/demultiplexing unit 100 and the backplane interface core 300, has a transmission unit and a reception unit. The transmission unit of the interface unit 200 sends an sys_fp signal to the backplane interface core 300, sends a per-port SPE signal (may be identical with the sys_fp signal) regarding the sys_fp signal to the demultiplexing block so that a core-side circuit of a sian0_8 p portion is operated only in a corresponding interval, and transfers data corresponding to the SPE signal to the backplane interface core 300. The reception unit of the interface unit 200 transfers an SOP signal to the multiplexing unit together with a BOP that is found from the packet transferred along with the SPE signal. The SPE signal transferred from the backplane interface core 300 is transferred to the core-side circuit of the sian0_8 p portion so that the circuit is operated only in the corresponding interval.

Ingress data (i.e., data inputted from a line card to a switching card) corresponding to two ports are processed by the multiplexing unit, and egress data (i.e., data outputted from the switching card to the line card) corresponding to two ports are processed by the demultiplexing unit. In a single FPGA, four multiplexing units and four demultiplexing units are paired to form four couples, so the FPGA can manage eight ports.

When a serial backplane is employed, there is requires a circuit that carries out an adaptation function between the serial backplane interface core 300 and the multiplexing/demultiplexing unit as shown in FIG. 7. Therefore, a case where an ORT8850 core available from Agere Systems is used as the serial backplane is descried hereinafter.

Figure 8:
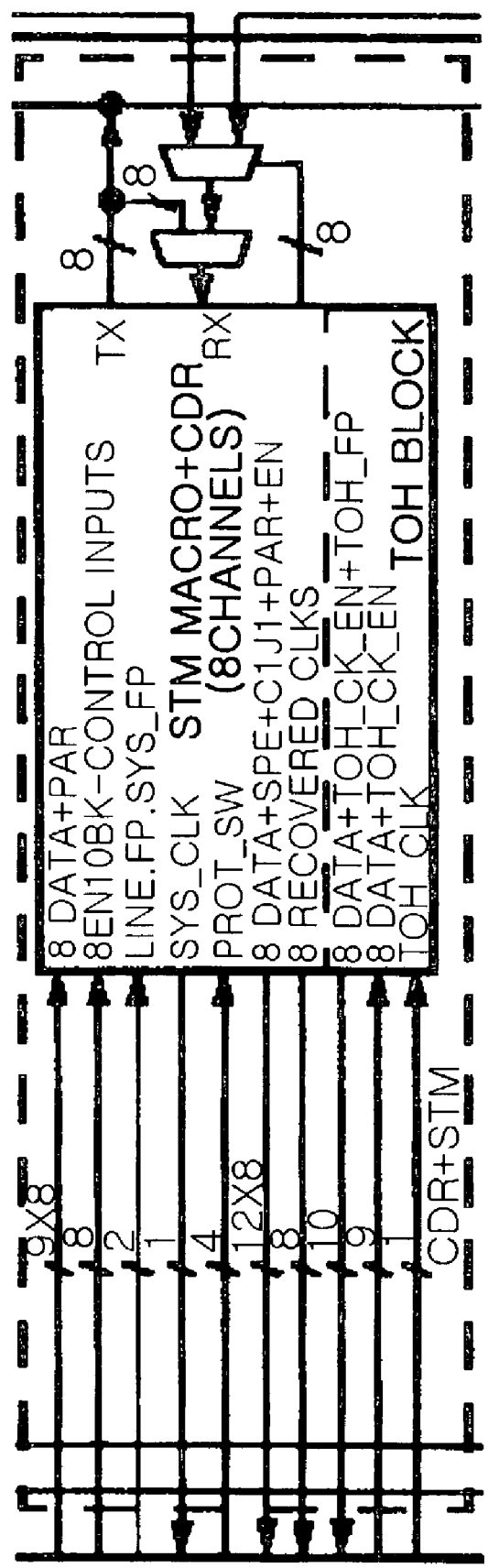
FIG. 8 illustrates an interface of a backplane core.

In order to communicate with the line card via the serial backplane ORT8850, the switching system is necessarily interfaced with a CDR (Clock and Data Receiver)+STM block as shown in FIG. 8. In a transmitting side, data and 9 bit data of PAR are inputted about 8 channels and the SYS_FP signal is inputted in order to indicate the starting point of the frame. Such a reception unit is constituted by a SYS_CLK provided from the core. A K-control input for 8B10B is not used. When used for general data transmission such as the OLT, only DATA, PAR and SYS_FP are inserted. Based upon the SYS_FP signal, instead, the data should be passed over to the SPE interval only. Except for the SPE interval, TOH is inserted into the STM core.

DATA, LINE_FP, an SPE interval signal, a C1J1 starting point, a PAR and an EN signal are inputted to an input side of the CDR +STM block. Where a pointer interpreter is bypassed, eight restored clocks appear. A TOH value is extracted from the TOH block and outputted along with TOH_CK_EN and TOH_FP signals. When used for general data transmission such as the OLT, only the DATA, the PAR signal and SPE signal are used. Additionally, it is necessary to provide four inputs for protection switching.

When such an STM/CDR core is used (in this case, data formats for an ASX or ACE available from Lucent Technology and an SIAN-1 available from Erlang Technology are different from each other), the reception unit of the STM/CDR core receives DATA and PAR signals transmitted together with an SPE signal and the transmission unit transfers only DATA and PAR signals along with an SYS_FP signal.

An adaptation logic is designed so that a general ATM cell processing circuit can be interfaced with the STM/CDR core of the ORT8850. More FIFOs prevent such a circuit from being easily embodied on an FPGA and multiplexing and demultiplexing units thereof are provided with FIFOs, so the circuit is preferably designed not to require more FIFOs.

Figure 9:
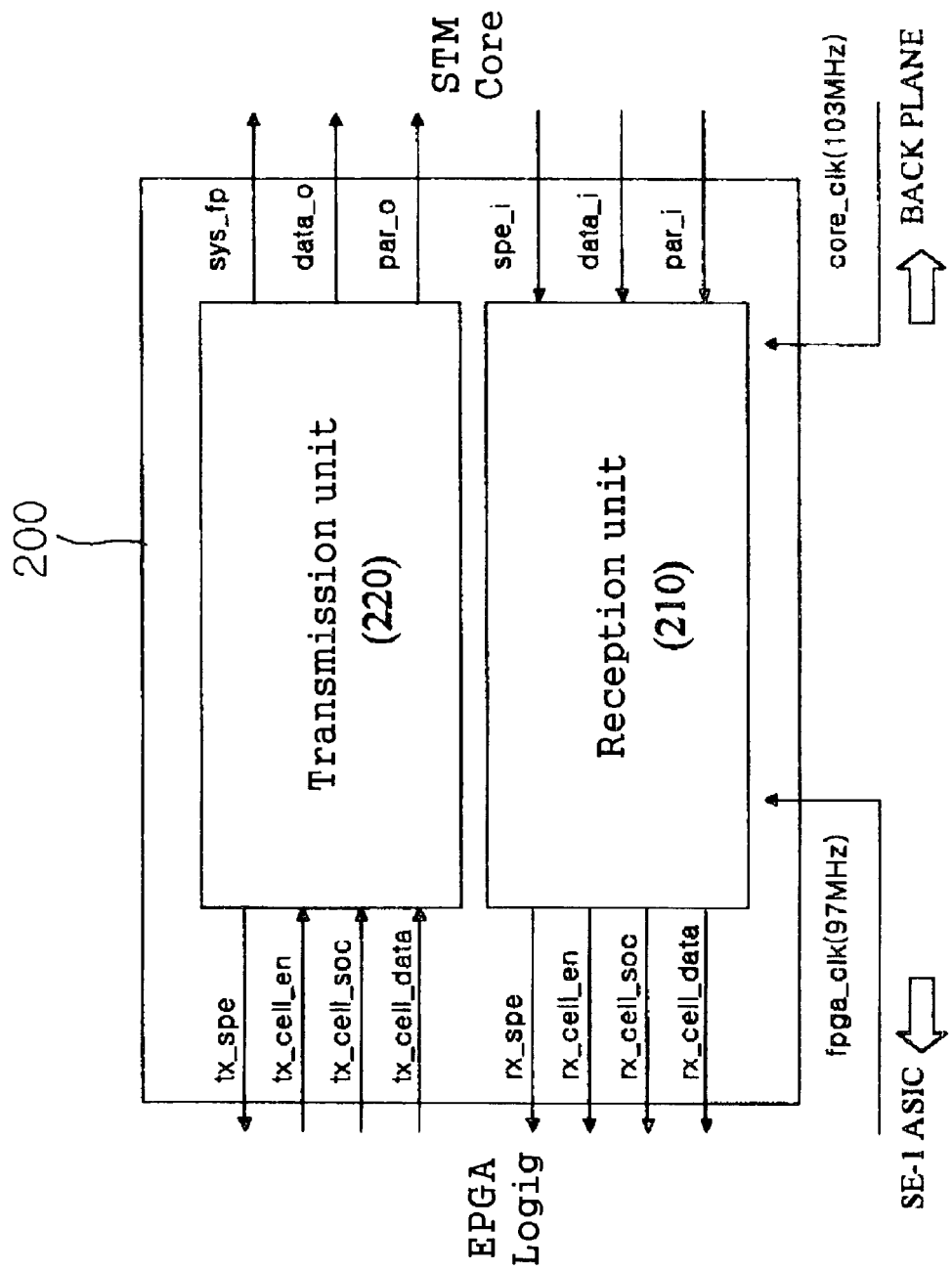
FIG. 9 is a view showing a detailed configuration of the interface unit of FIG. 7.

FIG. 9 illustrates a detailed configuration of the interface unit 200 of FIG. 7 with respect to one port.

When transmission is performed, the FPGA logic transfers only a transmission cell enable (tx_cell_en) signal, a transmission cell start signal (tx_cell_soc) and a transmission cell data (tx_cell_data) with respect to a transmission SPE (tx_spe) interval, and the length of a cell is assumed as 64 bytes. In contrast, when reception is performed, the FPGA logic outputs only a receiving cell enable (rx_cell_en) signal, a receiving cell start signal (rx_cell_soc) and a receiving cell data (rx_cell_data) together with a receiving SPE interval (rx_spe) signal, and the length of a cell is 64 bytes. The tx_cell_en is active high, the rx_cell_en is high only in an interval having cell data. The tx_cell_soc and the rx_cell_soc are '1' only at the initial byte portion of the cell data. The FPGA logic is operated only in the spe interval when transmission and reception are carried out.

Figure 10:
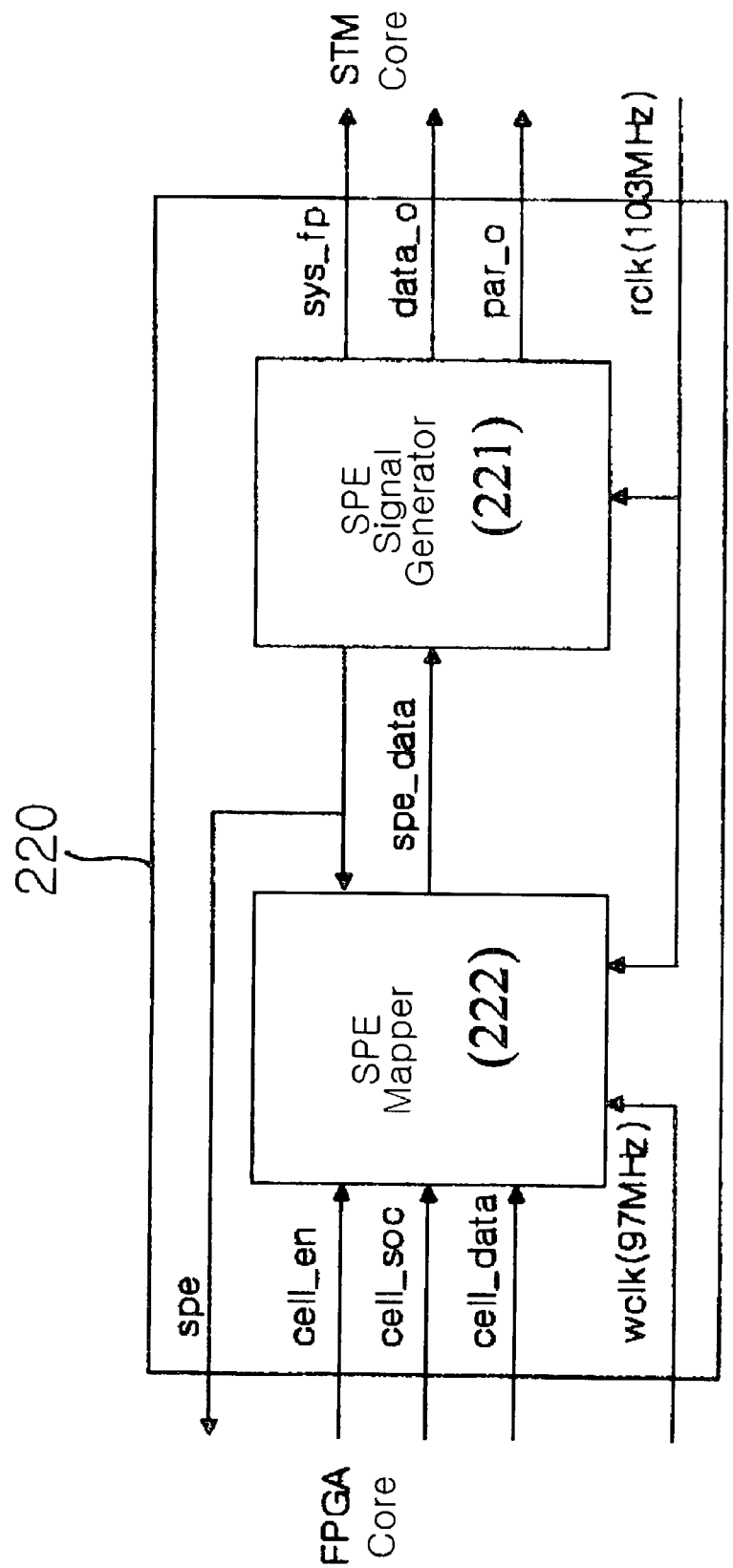
FIG. 10 is a view showing a detailed configuration of a transmission logic of an interface unit shown in FIG. 9.

FIG. 10 illustrates a detailed configuration of a transmitting logic 220 of the interface unit shown in FIG. 9.

Herein, a cell may mean not only an ATM cell but also a packet of a common length. In FIG. 10, an spe signal generator 221 generates an spe signal, latches data transferred from the spec mapper 222 and transfers the data toward the core 300 together with a parity value. At the same time, the spe signal generator 221 generates and transfers a sys_fp signal, so the core 300 can be notified of the starting point of a frame. In order to obtain timing information of a 9×270×4 STM frame for the above purpose, a multi-stage counter is constructed to generate a necessary spe signal, and decoded to produce a sys_fp signal. The timing between the SPE signal generator 221 and the spe mapper 222 is as shown in FIG. 11.

The spe mapper 222 is not operated in an interval where the spe is 0. The spe mapper 222 receives cell_en, cell_soc and cell_data, and inserts a starting pattern of a valid cell when the cell_en is '1' at the starting position of a packet. Additionally, the spe mapper 222 inspects the cell_soc and the cell_en at the starting position of the next packet by extracting and viewing a length, and insert the starting pattern of a valid packet again or a starting pattern of an idle packet.

Figure 11:
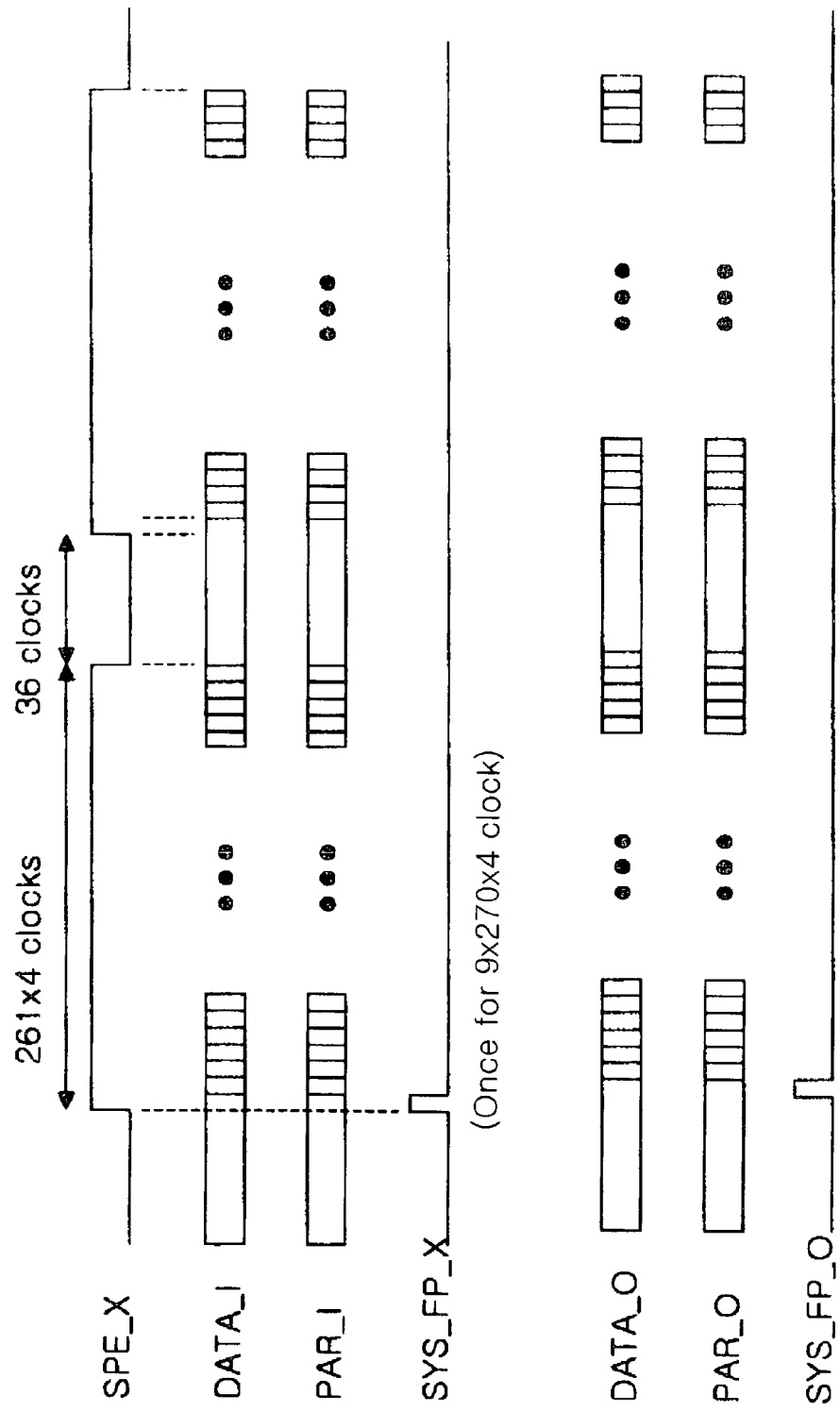
FIG. 11 is a view showing timing of an SPE mapper shown in FIG. 10.

Referring to FIG. 11, an SPE_X is an SPE signal sent toward the FPGA logic, and DATA_I and PAR_I are data and a parity bit received from the FPGA logic, respectively. A SYS_FP_X signal is a SYS_FP signal (i.e., a signal indicating the starting position of an STM frame) in the SPE signal generator, which has the same standards as the SPE_X. The SPE signal generator 221 (see FIG. 10) receives the DATA_I and the PAR_I in an SPE_X interval, re-times them, and outputs them toward the STM core. Additionally, the SPE signal generator 221 delays the SYS_FP_X signal by one clock and provides the SYS_FP_X signal toward the STM core together with a parity value.

Figure 12:
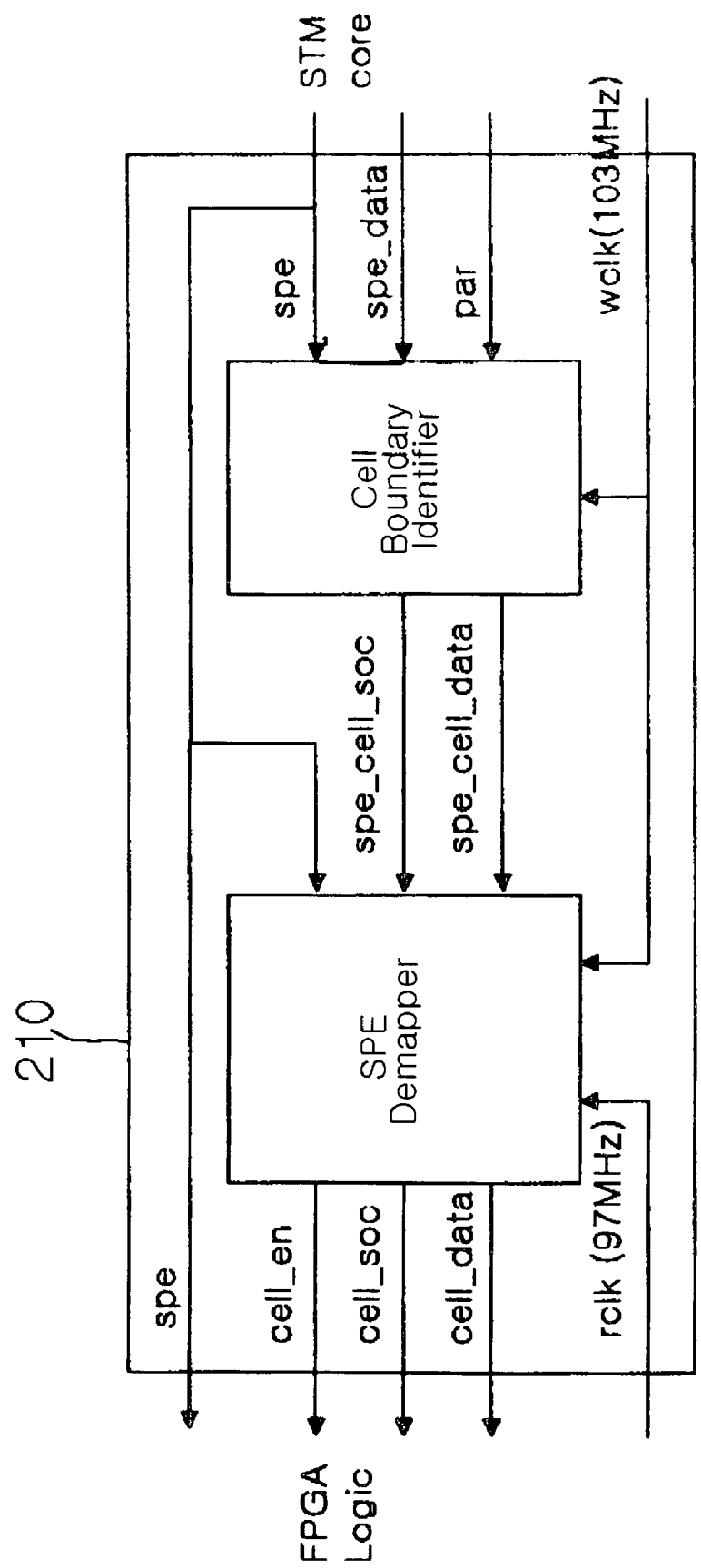
FIG. 12 is a view showing a detailed configuration of a reception unit of the interface unit shown in FIG. 9.

FIG. 12 illustrates a detailed configuration of a reception unit 210 of the interface unit shown in FIG. 9.

A cell boundary identifier 211 is operated in the spe interval only in response to the SPE signal from the core 300, and functions to identify the boundaries of a cell, generate spe_cell_soc and spe_cell_data and transfer them to an spe demapper 212. The spe_cell_soc and the spe_cell_data exist only in the spe interval, and are not varied in the other intervals. In order to easily identify the boundaries of a cell, the starting patterns of the cells are inspected as described above. Extracted length information is used for a valid cell, while a basic length is considered as 64 for an idle cell. Then, the starting pattern is inspected at the starting position of a next packet to identify the boundaries of the cell, thereby obtaining synchronization. The initial bytes of a valid cell and an idle cell are determined as "FF" and "FE", respectively. In order to identify the boundaries of the cell, the cell boundary identifier 211 manages a boundary identification synchronizing signal by inspecting a starting pattern (all of the upper 7 bits are 1) while inspecting the length of the packet. This synchronization has a hunt state, a pre-synchronous state and a synchronous state as in the state machine that identifies the boundaries of the cell in an ATM physical layer. The starting patterns are searched for by the byte in the hunt state. If any starting pattern is found once, the state machine transits from the hunt state to the pre-synchronous state and inspects the starting patterns by the cell. If the starting patterns are found six consecutive times, the state machine transits from the pre-synchronous state to the synchronous state. If the starting patterns are not hit in the pre-synchronous state, the state machine returns from the pre-synchronous state to the hunt state. If the starting patterns are not hit seven consecutive times, the state machine returns from the synchronous state to the hunt state (a lower 1 bit is used to distinguish a valid cell from an idle cell). The numbers of consecutive successes and failures that are used as state transition conditions in acquiring synchronization can be varied.

The spe demapper 212 receives spe_cell_data and spe_cell_soc together with a spe interval signal to inspect whether a packet is idle in an soc portion. If the packet is not idle, the spe demapper 212 transfers the spe_cell_data and the spe_cell_soc together with the cell_en toward the FPGA logic. This can be modified to be processed without a 64 byte slot.

Next, the multiplexing/demultiplexing unit will be described.

Figure 13:
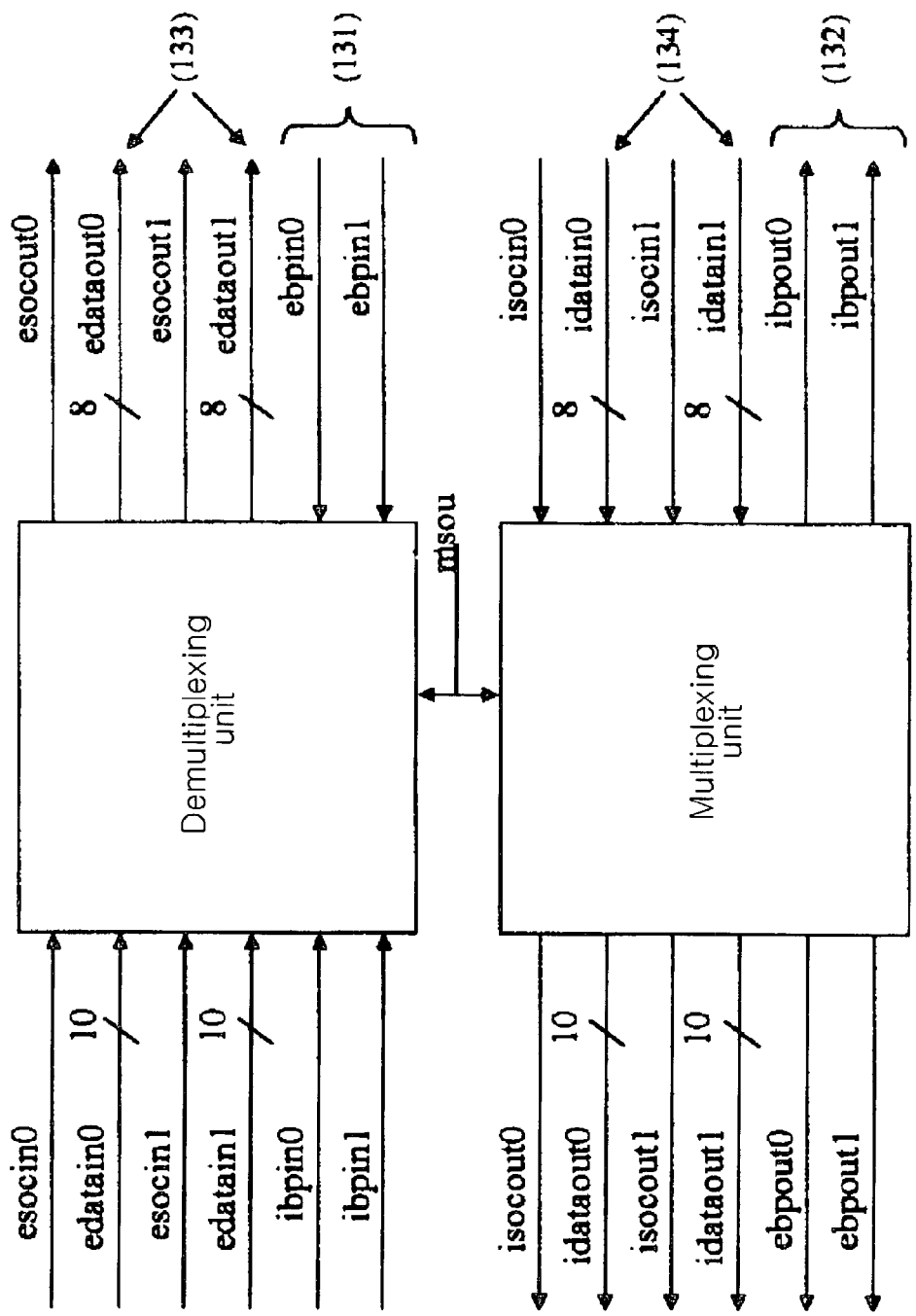
FIG. 13 is a detailed block diagram showing a multiplexing/demultiplexing unit in accordance with the present invention.

FIG. 13 illustrates a detailed configuration of the multiplexing/demultiplexing unit for managing two ports.

Referring to FIG. 13, when a serial backplane is employed, ingress back pressures 132 or egress back pressures 131 can be transferred on egress data packets 133 or ingress data packets 134, respectively, without using separate signal lines. In this case, ingress back pressures ibpin0 and ibpin1 are transferred on egress data from a switching unit to a line card, and egress back pressures ebpin0 and ebpin1 are transferred on ingress data from the line card to the switching unit.

Figure 14:
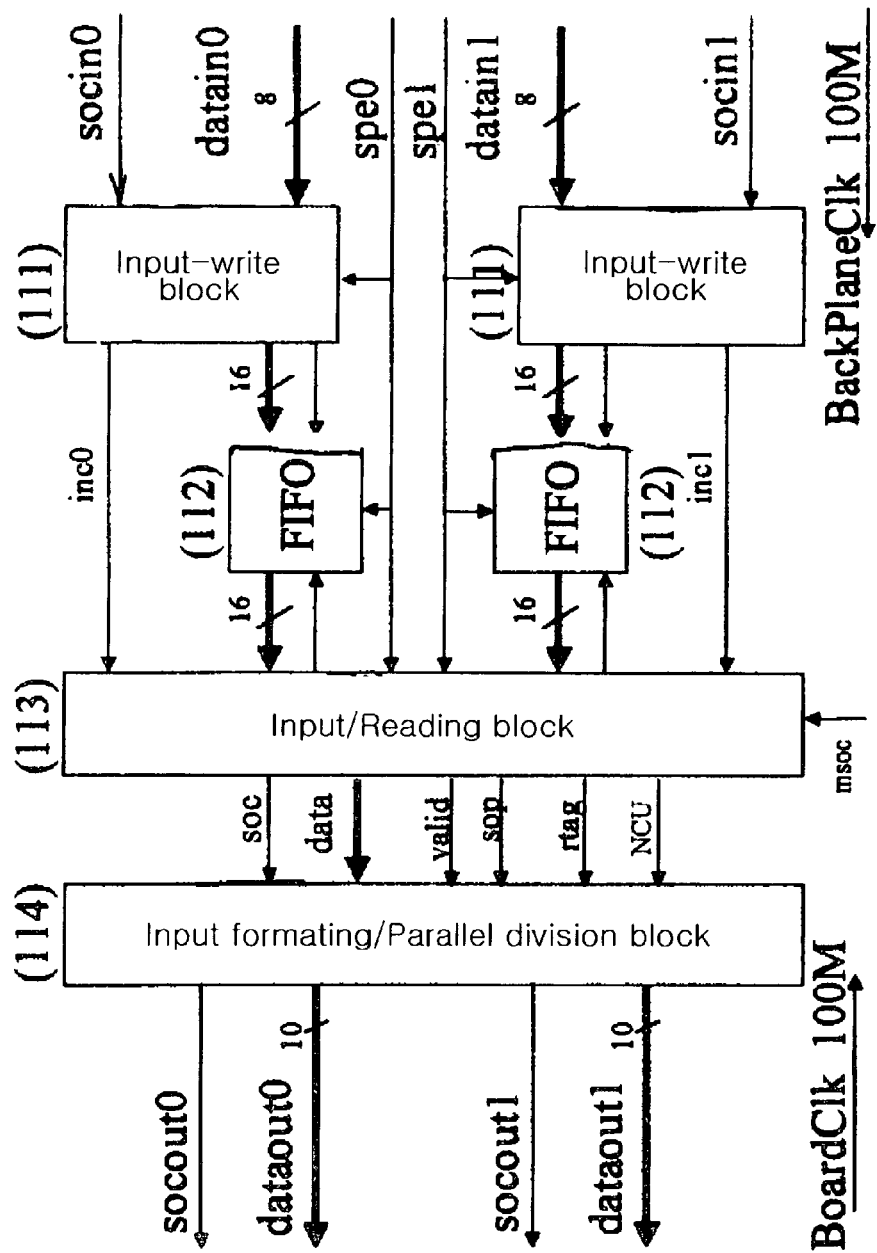
FIG. 14 is a detailed block diagram showing a multiplexing unit in accordance with the present invention.

FIG. 14 illustrates a detailed configuration of the multiplexing unit.

From the backplane, each of input-write blocks 111 is operated by using the spe interval signal as a clock enable signal, and functions to convert input data into 16-bit data by accumulate input data by two bytes while excluding a reserved byte, and to write the converted input data into an FIFO 112. At the same time, the input-write block 111 generates an inc pulse whenever a unit (16 words) is written. Further, the input-write block 111 extracts length information from the initial portion of the packet and finds the number of words. The input-write block 111 reduces the data to word unit pieces while writing the same into the FIFO 112. When the last unit of the packet is written, the input-write block 111 generates the inc pulses while writing the last word even if 16 words are formed.

Figure 15:
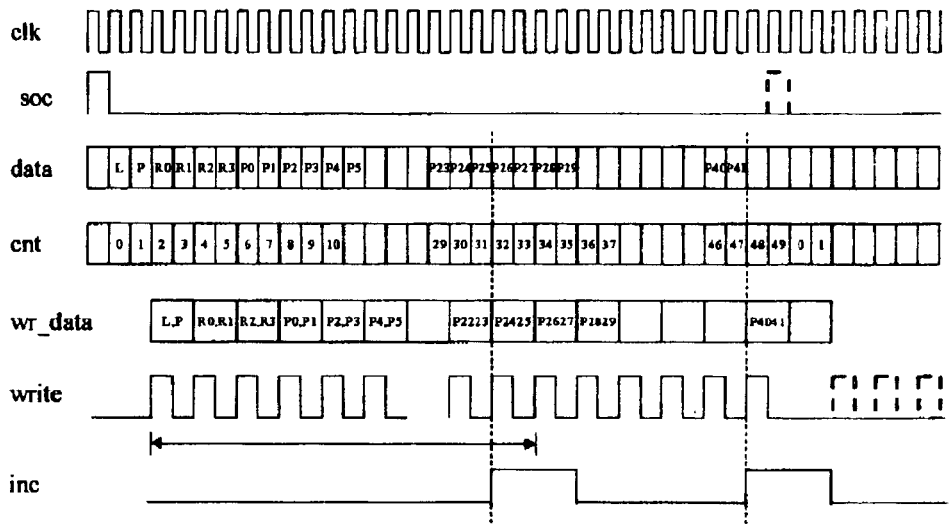
FIG. 15A illustrates the timing of an input-write block when the length of a packet is even.
FIG. 15B illustrates the timing of an input-write block when the length of a packet is odd.
Figure 15:
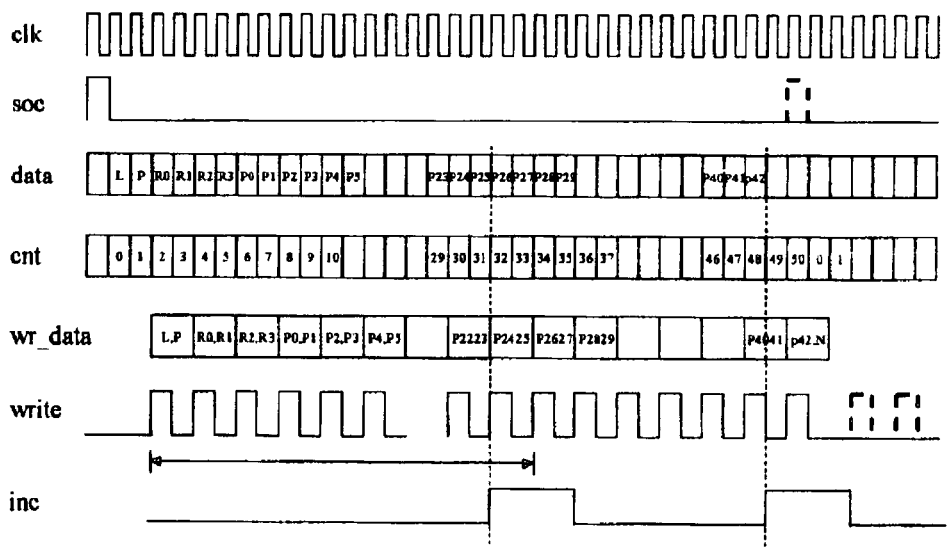

FIG. 15A illustrates the timing of the input-write block 111 when the length of a packet (i.e., the byte numbers of the RT and the BIP) is an even number, and FIG. 15A illustrates the timing of the input-write block 111 when the packet length is an odd number.

When a data write clock is different from a data read clock, it is necessary to synchronize the INC pulses with the read clock at the boundary of the clock. In FIGS. 15A and 15B, sufficiently long pulses are produced to allow transition to be detected in the other clocks and used.

The input-write block 111 has a preCNT value, which is given 1 as SOC, and becomes 0 at lengthT+1 after being continuously increased. Variation is stopped at 0. A CNT value is obtained by delaying the preCNT value. The length is an extracted value and the number of bytes between the RT and the BIP. LengthT is a value obtained by adding 6 to the length. The following conditions are required to perform write regardless of whether the packet length is odd or even: First, if the lengthT is even, the CNT is odd and upper 7 bits of the CNT are smaller than upper 7 bits of the lengthT. Second, if the lengthT is odd, the CNT is odd and the upper 7 bits of the CNT are equal to or smaller than the upper 7 bits of the lengthT.

The input-read block 113 receives inc0 and inc1 pulses transferred with the SPE interval signal as the clock enable signal, and synchronizes the same to the operation clock of the switch chips to increase the units stored in the FIFOs 112 each. Such increment signals are meaningful only to the SPE interval signal. If the pulses have a non-zero value, the input-read block 113 read data from the corresponding FIFO and transfers data to an input formatting/parallel division block 114. If both of the FIFOs 112 have the packets, service is alternately performed with the same priority.

Figure 16:
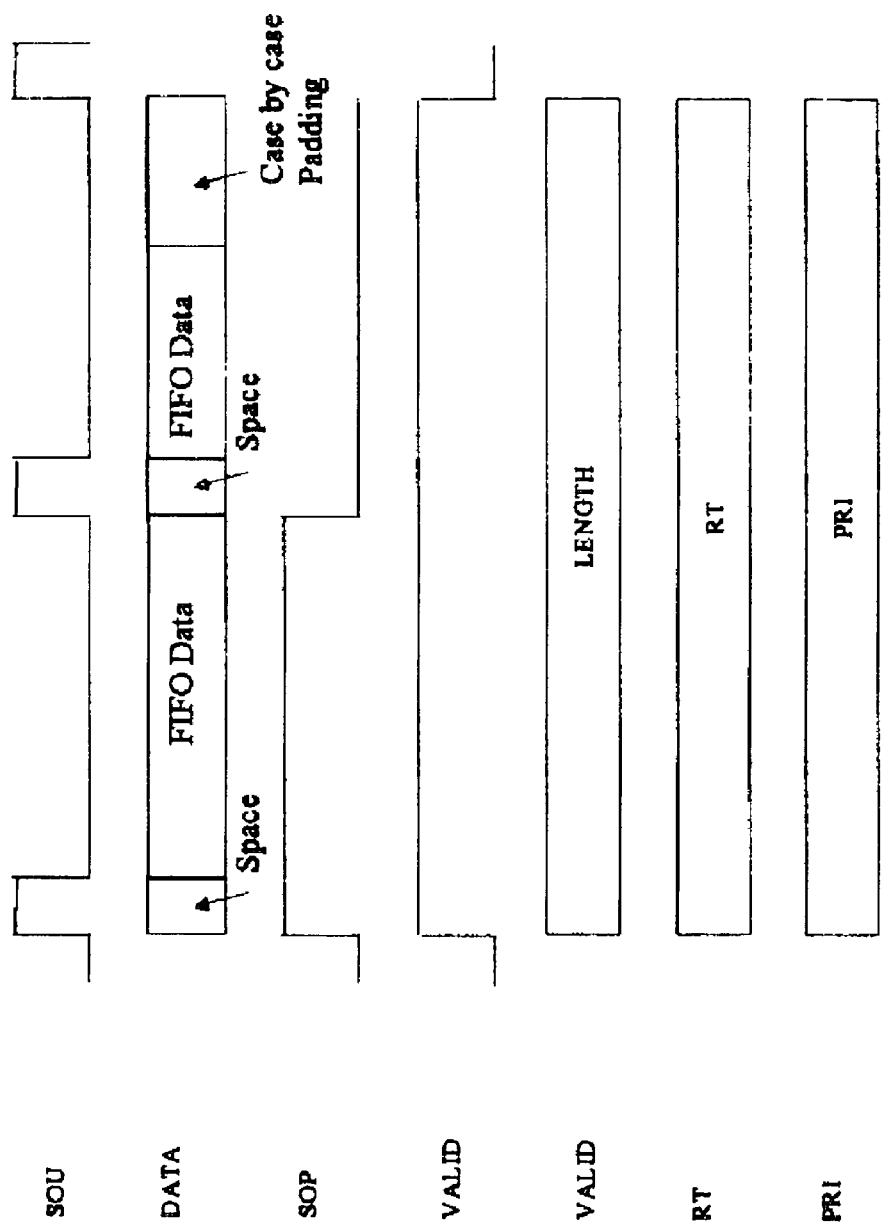
FIG. 16 illustrates an interface between an input-read block and an input-formatting/parallel division block.

When the first unit of the packet is read, the number of the words is calculated and reduced by extracting length information. When the last unit of the packet is being read (which can be known by the number of the words), 16 words are outputted with those portions lacking for 16 words padded with 0. Further, the soc is periodically outputted at the starting position of the unit, and the SOP is outputted for a unit corresponding to the BOP. At portions corresponding to the position requiring insertion of the overhead, the FIFOs are not read in advance so that those portions are skipped and padded with 0. Additionally, for the purpose of generating an overhead in the input formatting/parallel division block 114 downstream of the input-read block 113, the input-read block 113 generates an RT value and an NCU value in the packet and transfers the same to a unit corresponding to the beginning of the packet. An interface between the input-read block and the input formatting/parallel division block 113 is as shown in FIG. 16.

Figure 17:
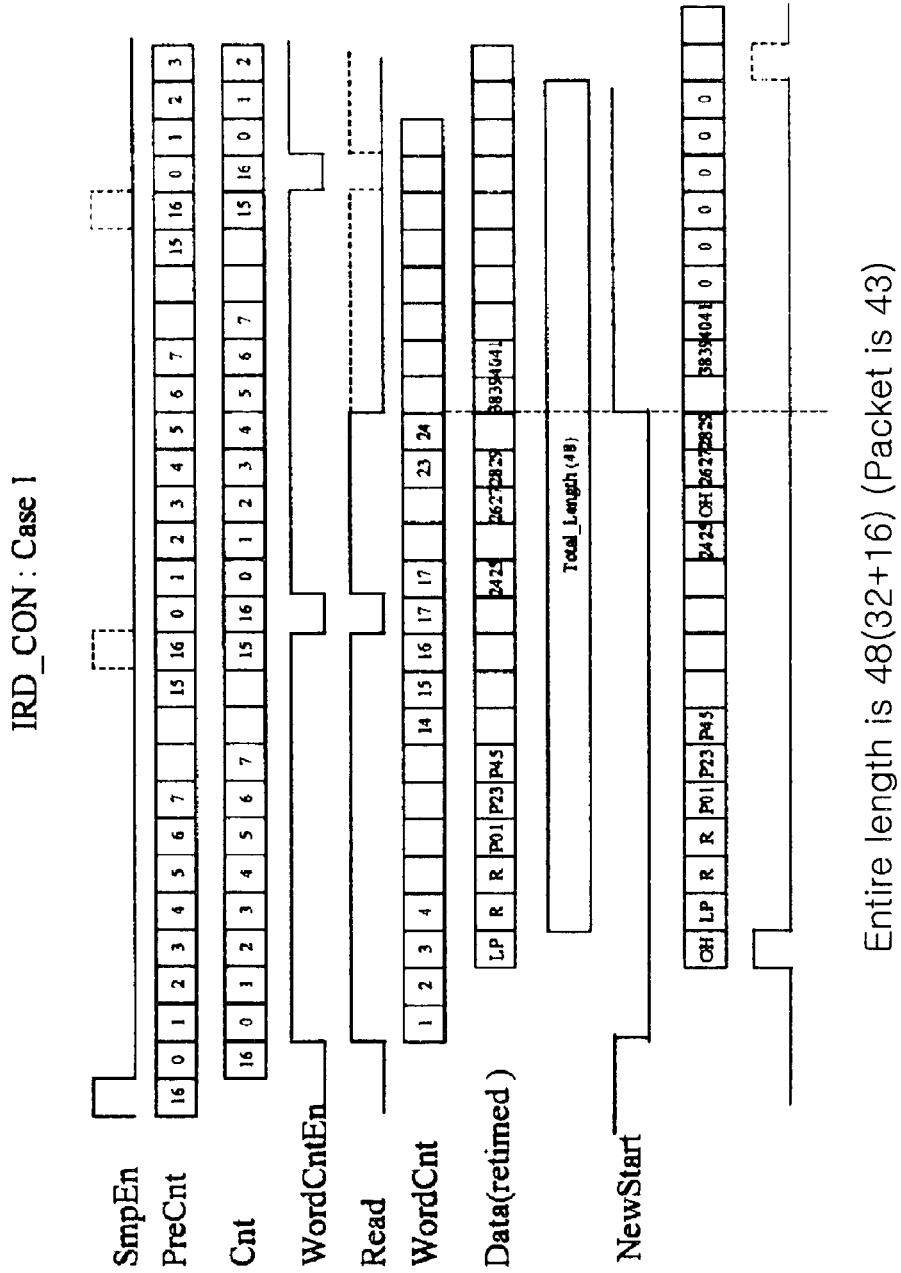
FIG. 17 illustrates the timing of an input-read block.

FIG. 17 illustrates the timing that the input-read block 113 reads one FIFO and sends the data to correspond to the above interface.

Referring to FIG. 17, SmpEn is a signal that is periodically inputted to determine the starting phase of a unit and sets PreCnt to 0 and increases the same therefrom, and Cnt is a delayed value of the PreCnt. A WordCntEn signal for increasing WordCnt and a Read signal functioning as an FIFO-reading signal are generated as shown in FIG. 17. When data is read and re-timed, a blank is filled into the overhead position and data read in the FIFO is outputted after being multiplexed. In order to control the foregoing Read signal, flags, such as NewStart for indicating that reading of a new packet is initialized and nowis0 and nowis1 for indicating which FIFO is currently read are used, are used in addition to the WordCnt.

Figure 18:
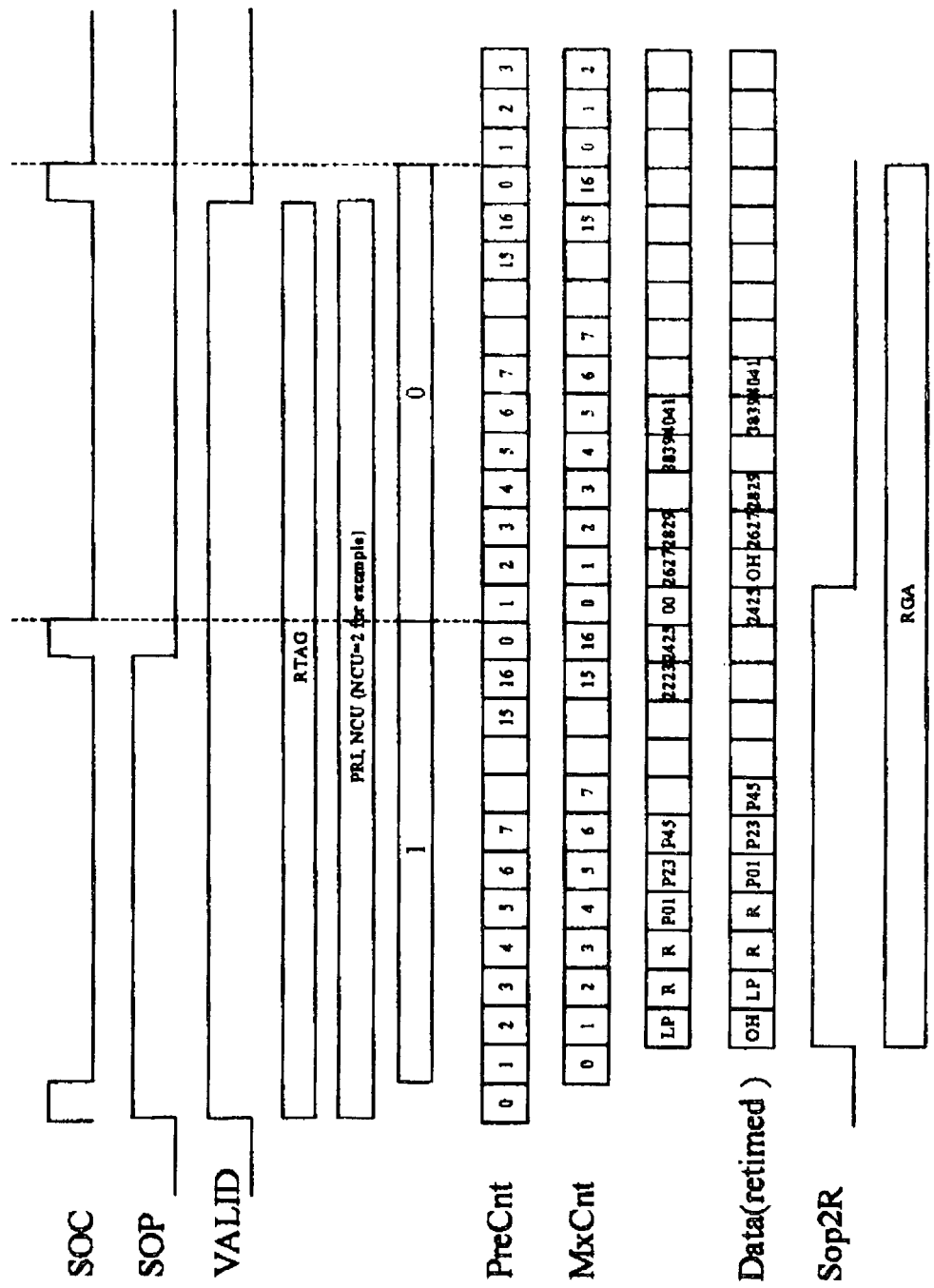
FIG. 18 illustrates the timing of an input formatting/parallel division block.

The input formatting/parallel division block 114 functions to pad vacant overhead positions with values to be used in the switch chips using the RTAG and the NCU while dividing 16-bit data inputted from the input-read block 113 into 8-bit pieces and transferring the same to upper and lower switch chips. The timing of the input formatting/parallel division block 114 is as shown in FIG. 18.

When a serial backplane is employed and there is no back pressure signal line, the egress back pressures from the line card into the switch chip are transferred on the ingress data. In this case, the input-write block is further provided with functions for extracting the egress back pressures as well as for generating the back pressure signals in the form that can be accepted by the switch chip using extracted information and transferring them to the switch chip.

Hereinafter, description will be given of the structure and operation of the demultiplexing unit.

Figure 19:
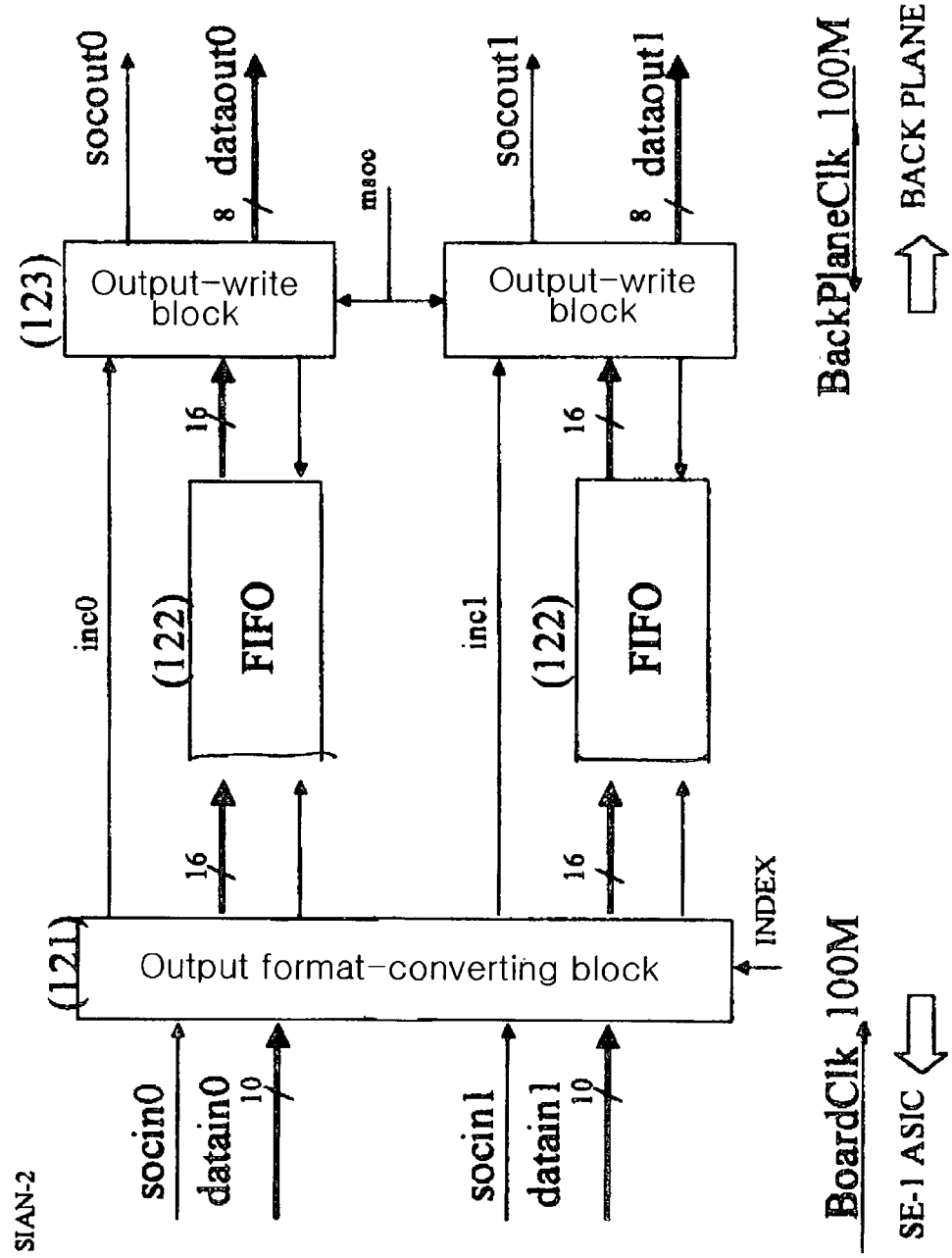
FIG. 19 is a block diagram illustrating an demultiplexing unit in accordance with the present invention.

As shown in FIG. 19, the demultiplexing unit comprises an output-write block 121 for adding data inputted from switch chips ASIC and writing them in a 16-bit form into the corresponding FIFO 122 according to destinations, two 16 bit FIFOs 122 for storing data according to output ports (the widths of the FIFOs are 32 bits when four SE-C chips are used) and output format-converting blocks 123 provided to correspond to the FIFOs for reading data from the FIFOs 122 and transferring them to the backplane.

The output-write block 121 adds the data (corresponding to the identical packet) inputted from two switch chips, and writes the added data in the 16 bit form into the corresponding output FIFOs 122 according to the destinations. If the inputted unit is the starting unit of the packet, the block 121 reads two bit routing information corresponding to the output port by extracting the RT portion so as to find the output port, and extracts length information of the packet to find how many words will be written. The block 121 writes those portions except for the overhead for the switch chip into the corresponding FIFO in the 16-bit form using such information obtained from the first three words. Additionally, increment pulses inc are outputted by the packet rather than by the unit and transferred toward the output format-converting block 123 so as to provide for a case where the speed of the backplane is faster than the operation speed of the switch chip.

Figure 20:
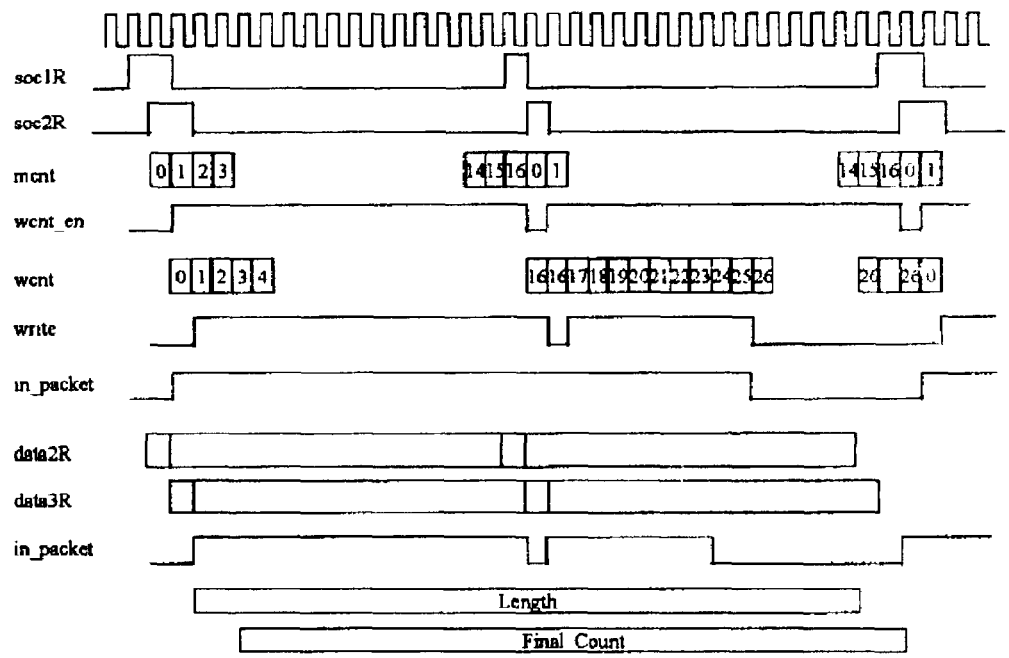
FIG. 20a illustrates the timing of an output-write block when the length of a packet is 50.
FIG. 20b illustrates the timing of an output-write block when the length of a packet is 51.
Figure 20:
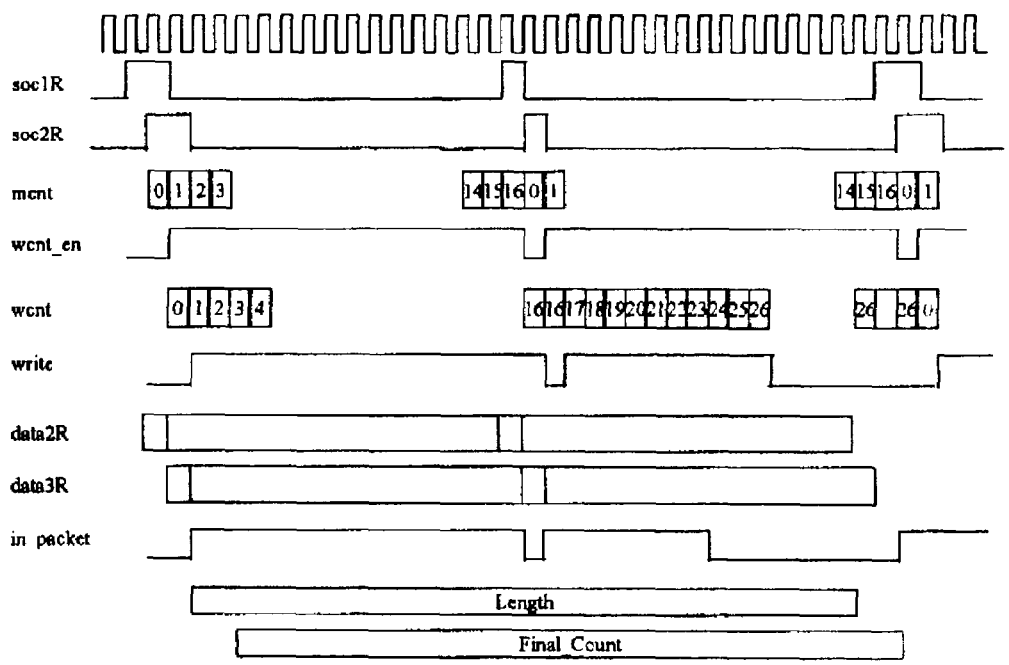

FIG. 20A illustrates the timing of the output-write block when the packet length is 50, and FIG. 20B illustrates the timing when the packet length is 51.

The output converting-converting block 123 increases internal counters (the number of packets) by receiving the inc pulses, and functions to transfer the packet read from the FIFO into the backplane if at least one packet exists in the FIFO. In this case, the packet is read by the 16-bit unit and outputted in the form of the initial 8-bit pack plane signal, so one reading is carried out every two clocks. First-read three words are used to re-construct the overhead of the backplane signal.

Figure 21:
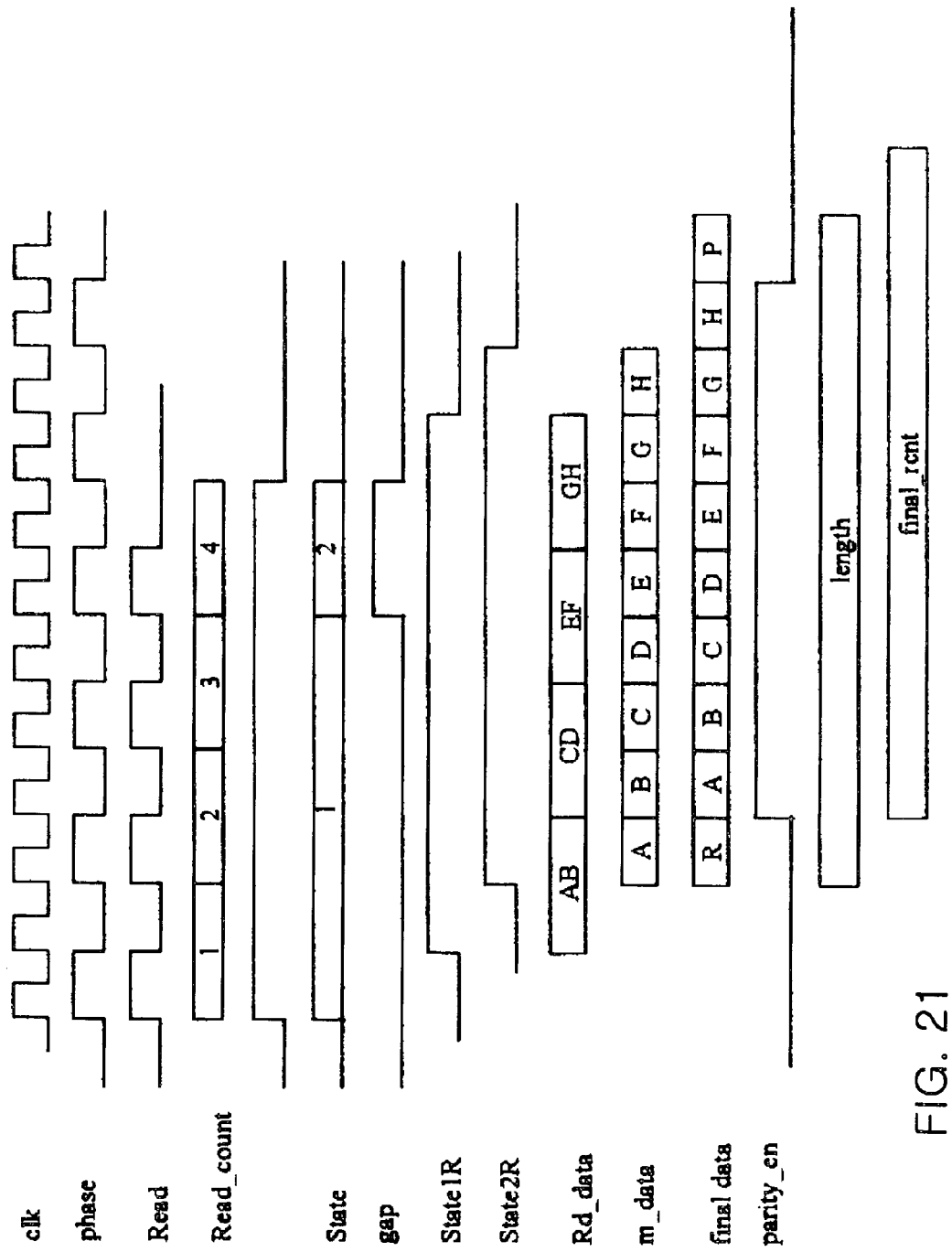
FIG. 21 illustrates the timing of an output format-converting block.

FIG. 21 illustrates the timing of the output format-converting block.

In the output format-converting block, a phase signal is toggled as shown in FIG. 21. When the phase signal is 0, a state machine changes into state 1 when the flag is 1, stays at this state until a reading counter becomes the same as final_cnt[8:1], and returns to state 0 via state 1. A gap signal exists in the state 2, and this state and phase signal are used to carry out upper/lower byte selection and BIP insertion to the data read in the FIFO 122.

When 20 Gbps switching is carried out, ingress back pressures outputted from the switch chips are inputted in one frame over 8 units. In detail, pressures are inputted while being divided from two chips, and an ESOU value at an egress-side indicates a first unit. When the serial backplane is employed and no back pressure signal lines are provided, the ingress back pressures are transferred on the egress data into the line card. In this case, a function for transferring the ingress back pressures is included within an FIFO reading block. The output format-converting block receives two ingress back pressure signals from the two switch chips or ASICs, extracts an overall back pressure value and back pressure values for each of the 16 ports and for each of 8 levels, and transfers these values in the form that can be processed in the line card via dedicated signal lines or on the overhead portions of the egress data.

As described above, the present invention can carry out high-speed switching for 622 Mbps 16×16 ports (or channels) or 2.5 Gbps 4×4 ports (or channels) of 20 Gbps capacity in a non-blocking manner without the intervention of software. Additionally, the present invention can accept various signals such as ATM, 10/100 Ethernet, GE and Packet Over SDH signals regardless of the protocols such as ATM and the IP, and can be easily expanded up to 40 Gbps in its capacity. Moreover, the present invention can implement a 20 Gbps ATM distribution switching function in a single board and accelerate inter-board connection, so the simplification of construction is achieved and the reliability of signal transfer is improved, thereby constructing a cost efficient OLT system.

Although the preferred embodiments of the present invention have been disclosed for illustrative purposes, those skilled in the art will appreciate that various modifications, additions and substitutions are possible, without departing from the scope and spirit of the present invention as disclosed in the accompanying claims.

What is claimed is:

1. A variable length packet switching system, comprising:
    at least two switching means for switching ATM cells or variable length packet data in parallel;
    a plurality of multiplexing means arranged upstream of said switching means for multiplexing data inputted from a line card to said switching means in packet units and dividing a packet into packets of a number corresponding to the number of said switching means, the multiplexing means further comprising input-write means for converting 8-bit input data, which is inputted from said line card to said switching means, into double or quadruple bit width data and storing the data, FIFOs corresponding to ports for storing the input data expanded by the input-write means, input-read means respectively provided to two or four FIFOs for reading a corresponding FIFO if the FIFO has input data, and, at the same time, arranging and outputting control information extracted from a front portion of a packet while observing said FIFOs, input formatting/parallel division means for dividing the data from said input-read means into portions to be transferred into each of said switching means according to bit positions, inserting overheads into the data by using routing information, priority information and beginning-point-of-packet information, and transferring the data to said switching means, wherein said input-read means does not read the FIFOs for a corresponding clock at positions where the overheads will be inserted by said input formatting/parallel division means as the data read from said FIFOs is transferred into said input formatting/parallel division means, whereby the data at the corresponding positions is transferred as an invalid value; and
    a plurality of demultiplexing means arranged downstream of said switching means for combining packets inputted after being switched in parallel by said at least two switching means and outputting the combined packet converted into a format adequate to said line card.

2. The variable length packet switching system in accordance with claim 1,
    wherein said input-write means sends an increment signal for increasing the level of said FIFOs to said input-read means, said increment signal being generated once for the unit data of 17-clock length and 10-bit unit and in consideration of the formation of one unit by padding even if the last portion of the packet does not have a certain amount of data corresponding to one unit data, and
    wherein said input-read means initializes reading when said FIFOs have at least one unit data, extracts length information when a first unit of the packet is read, inserts a padding byte into an insufficient portion using length information while reading the unit by ones, and does not read said FIFOs in positions where the overheads are inserted by said input formatting/parallel division means.

3. The variable length packet switching system in accordance with claim 1, wherein said demultiplexing means each comprises:
- output-write means for combining data inputted in parallel after being switched in parallel from said switching means according to bit positions, writing the combined data directly into a corresponding one of the two or four FIFOs having data bit widths the same as the combined data according to the final output ports to which the data is destined, and preventing writing temporarily stopped at overhead portions to store an actual packet into a buffer;
- two or four FIFOs provided to each of the final ports for storing the input data expanded by said output-write means; and
- output format-converting means respectively provided to said FIFOs for reading the data from the FIFO if stored data exists, and outputting the data converted into a format adequate to said line card while observing states of said FIFOs.

4. The variable length packet switching system in accordance with claim 3, wherein said output-write means increases level increment signal of the FIFO in the packet units if the transmission speed of a backplane is higher than the speed of a switch, or generates the increment signal if a partial data of the packet is stored in consideration of the length of the packet.

* * * * *